(12) United States Patent
Dharmaraj et al.

(10) Patent No.: US 11,702,229 B2
(45) Date of Patent: Jul. 18, 2023

(54) BERTHING SYSTEM FOR SPACECRAFT

(71) Applicant: The Boeing Company, Chicago, IL (US)

(72) Inventors: Raju Dharmaraj, League City, TX (US); Thomas L. Hoffman, Friendswood, TX (US)

(73) Assignee: The Boeing Company, Chicago, IL (US)

( * ) Notice: Subject to any disclaimer, the term of this patent is extended or adjusted under 35 U.S.C. 154(b) by 914 days.

(21) Appl. No.: 16/416,078

(22) Filed: May 17, 2019

(65) Prior Publication Data
US 2020/0361640 A1 Nov. 19, 2020

(51) Int. Cl.
*B64G 1/64* (2006.01)
*F16B 7/04* (2006.01)

(52) U.S. Cl.
CPC .............. *B64G 1/646* (2013.01); *F16B 7/042* (2013.01)

(58) Field of Classification Search
CPC . B64G 1/646; B64G 1/12; F16B 7/042; F16B 7/0413
See application file for complete search history.

(56) References Cited

U.S. PATENT DOCUMENTS

| | | | | |
|---|---|---|---|---|
| 5,040,749 A | * | 8/1991 | Johnson | B64G 1/646 244/172.4 |
| 6,354,540 B1 | * | 3/2002 | Lewis | B64G 1/646 244/172.4 |
| 6,969,030 B1 | * | 11/2005 | Jones | B64G 1/646 244/135 A |
| 7,543,779 B1 | * | 6/2009 | Lewis | B64G 1/646 244/172.4 |
| 2004/0245405 A1 | * | 12/2004 | Tchoryk | B64G 1/646 244/172.4 |
| 2015/0266595 A1 | * | 9/2015 | Ghofranian | B64G 1/222 244/172.4 |
| 2018/0297723 A1 | * | 10/2018 | Sorensen | B64G 1/64 |

OTHER PUBLICATIONS

McFatter et al ,"NASA Docking System Block 1: NASA's New Direct Electric Docking System Supporting ISS and Future Human Space Exploration", 2018. (Year: 2018).*
W.H.Gerstenmaier et al., International Docking System Standard (IDSS) Interface Definition Document (IDD): Revision E; Oct. 2016.

* cited by examiner

*Primary Examiner* — Andrew Schechter
*Assistant Examiner* — Jeremy A Delozier
(74) *Attorney, Agent, or Firm* — Duft & Bornsen, PC

(57) ABSTRACT

Berthing systems for visiting spacecraft and associated methods. In one embodiment, a berthing system includes a tunnel having an interface surface that defines a hard capture mating plane for mating with a docking system of a target spacecraft. The berthing system further includes hooks disposed circumferentially on the interface surface, one or more pressure seals disposed on the interface surface, spring-loaded guide petals spaced around an inner peripheral surface of the tunnel that are configured to independently slide in the axial direction, and capture latches spaced around the inner peripheral surface that are configured to engage mechanical latch strikers on the docking system.

20 Claims, 21 Drawing Sheets

BERTHING SYSTEM FOR SPACECRAFT

FIELD

This disclosure relates to the field of spacecraft, and more particularly, to attaching a visiting spacecraft to a target spacecraft.

BACKGROUND

A space station, such as the International Space Station (ISS), is a large spacecraft that orbits the Earth. The ISS is an example of a target spacecraft equipped with docking ports that support crewed and un-crewed docking of visiting spacecraft. For example, a docking port at the ISS may include a Pressurized Mating Adapter (PMA) attached to a Common Berthing Mechanism (CBM). The International Docking System Standard Interface Definition Document (IDSS IDD) is an international standard that defines the interface parameters used by docking mechanisms, which is incorporated by reference as if fully included herein. A docking system can be either active or passive, or it can incorporate the operational features of both thereby making it considered to be "androgynous". The National Aeronautics and Space Administration (NASA) has developed the NASA Docking System (NDS) as an IDSS-compliant active docking system. An active IDSS-compliant docking system may be installed on the visiting spacecraft, and a corresponding NDS-compliant passive docking system is installed on a port of the target spacecraft to form a mating system. One type of NDS-compliant passive docking system for a target spacecraft is the International Docking Adapter (IDA) that attaches to a PMA on the ISS. An IDA is built to the IDSS so that any visiting spacecraft can dock with the adapters in the future. An example of an NDS-compliant active docking system for a visiting spacecraft is NDS Block 1 (NDSB1), which is configured to temporarily mate with an IDA. NDSB1 uses a soft capture ring to extend and latch onto an IDA for a soft capture. The soft capture ring is then retracted to pull the visiting spacecraft towards the IDA and hooks are engaged for a hard capture, which provides a structural connection ready for pressurization between the mated spacecraft that allows for cargo and crew transfer. While the IDSS IDD describes physical interfaces to be used for docking systems, it does not preclude systems from considering the use of berthing as the means for achieving a mated condition.

SUMMARY

Described herein is a berthing system for a visiting spacecraft configured to mate with an IDA or another type of docking system on a target spacecraft. Berthing is a mating operation between spacecraft where the visiting spacecraft is placed into the mating interface with a manipulator, such as a robot arm. The berthing system as described herein is passive for soft capture, as opposed to an active docking system having an extendible soft capture ring. A berthing operation for the berthing system is assisted by the manipulator on the target spacecraft that grasps the visiting spacecraft, and positions the visiting spacecraft with the berthing system facing the docking system of the target spacecraft. The berthing system is then mated to the docking system of the target spacecraft to provide a structural connection ready for pressurization between the mated spacecraft that allows for cargo and crew transfer. Although NDS-compliant docking systems are effective for their intended purpose, a berthing system as described herein may have reduced weight, is easily manufactured, and has less complexity. Thus, the berthing system may be installed on a wide range of visiting spacecraft, such as commercial spacecraft that may be developed for flights to the ISS or other target spacecraft.

One embodiment comprises a berthing system for a visiting spacecraft. The berthing system comprises a tunnel having a first end configured to attach to the visiting spacecraft, and a second end that includes an interface surface that defines a hard capture mating plane for mating with a docking system of a target spacecraft. The berthing system further includes hooks disposed circumferentially on the interface surface of the tunnel, and one or more pressure seals disposed on the interface surface. The berthing system further includes spring-loaded guide petals spaced around an inner peripheral surface of the tunnel, wherein the spring-loaded guide petals project in an axial direction beyond the interface surface and point radially inward. The berthing system further includes capture latches spaced around the inner peripheral surface of the tunnel, and configured to engage mechanical latch strikers on the docking system of the target spacecraft. The spring-loaded guide petals define a soft capture mating plane axially outward from the hard capture mating plane. The spring-loaded guide petals are configured to independently slide in the axial direction.

In another embodiment, a conic outline of the spring-loaded guide petals is less than a diameter of the tunnel.

In another embodiment, the spring-loaded guide petals each include a contact surface that curves radially inward in the axial direction, and a petal base parallel to the interface surface of the tunnel that defines the soft capture mating plane. The petal base is above the interface surface in the axial direction when the spring-loaded guide petals are in a soft capture state.

In another embodiment, the spring-loaded guide petals each include a soft capture sensor at the petal base configured to indicate contact with the docking system of the target spacecraft.

In another embodiment, the spring-loaded guide petals are part of guide petal assemblies that include a mounting member affixed to the inner peripheral surface of the tunnel, a guide petal of the spring-loaded guide petals slidably coupled to the mounting member, and an elastic member between the mounting member and the guide petal configured to apply a force on the guide petal in the axial direction away from the interface surface.

In another embodiment, the capture latches comprise a latch actuator and a latch arm that is mechanically linked to the latch actuator by a linkage. The latch arm is configured to engage one of the mechanical latch strikers on the docking system of the target spacecraft.

In another embodiment, the berthing system further includes guide pins that project in the axial direction from the interface surface of the tunnel, and guide pin receptacles recessed in the axial direction from the interface surface.

In another embodiment, a length of the guide pins corresponds with a distance between the hard capture mating plane and the soft capture mating plane.

In another embodiment, the berthing system further includes unberthing complete sensors disposed at the guide pin receptacles, and configured to indicate when guide pins on the docking system of the target spacecraft disengage from the guide pin receptacles.

In another embodiment, the berthing system further includes hard capture sensors at the interface surface configured to indicate contact with the docking system of the target spacecraft.

In another embodiment, the hooks comprise passive hooks configured to engage with active hooks on the docking system of the target spacecraft.

In another embodiment, the berthing system further includes pyrotechnic bolts configured to release the passive hooks.

In another embodiment, the hooks comprise pairs of active hooks and passive hooks.

Another embodiment comprises a berthing system of a visiting spacecraft for attaching to an IDA. The berthing system comprises a Hard Capture System (HCS) comprising a tunnel having a first end configured to attach to the visiting spacecraft, and a second end that includes an interface surface that defines a hard capture mating plane. The berthing system further comprises hooks disposed circumferentially along the interface surface of the tunnel, and configured to engage with corresponding hooks on the IDA. The berthing system further comprises one or more pressure seals disposed radially inward from the hooks along the interface surface, guide pins that project in an axial direction from the interface surface of the tunnel, and guide pin receptacles recessed in the axial direction from the interface surface. The berthing system further comprises a Soft Capture System (SCS) comprising guide petal assemblies spaced around an inner peripheral surface of the tunnel. The guide petal assemblies include a mounting member affixed to the inner peripheral surface of the tunnel, a guide petal slidably coupled to the mounting member and configured to project axially beyond the interface surface to define a soft capture mating plane axially above the hard capture mating plane, and an elastic member between the mounting member and the guide petal configured to apply a force on the guide petal in the axial direction away from the interface surface. The berthing system further comprises capture latches spaced around the inner peripheral surface of the tunnel. The capture latches are configured to extend to engage mechanical latch strikers on the IDA, and to retract to draw the interface surface of the tunnel toward the IDA.

In another embodiment, the HCS further comprises hard capture sensors configured to indicate when the IDA contacts the interface surface.

In another embodiment, the hooks comprise passive hooks configured to engage with active hooks on the IDA.

In another embodiment, the berthing system further comprises pyrotechnic bolts configured to release the passive hooks.

In another embodiment, the guide petal includes a contact surface that curves radially inward in the axial direction, a petal base parallel to the interface surface of the tunnel that defines the soft capture mating plane, and a soft capture sensor at the petal base configured to indicate when the IDA contacts the petal base.

In another embodiment, a pair of the guide petal assemblies and one of the capture latches are mounted in groupings along the inner peripheral surface of the tunnel, with the one of the capture latches interposed between the pair of the guide petal assemblies at each of the groupings.

Another embodiment comprises a method of performing a berthing operation of a visiting spacecraft. The method comprises navigating the visiting spacecraft to an initial position adjacent to a target spacecraft, grasping the visiting spacecraft with a manipulator on the target spacecraft, maneuvering the visiting spacecraft with the manipulator to a capture position so that a berthing system of the visiting spacecraft is aligned with a docking system of the target spacecraft, moving the visiting spacecraft with the manipulator so that guide petals of the berthing system contact the docking system of the target spacecraft and slide along the docking system to a soft capture position, generating an indicator of contact with the docking system of the target spacecraft via soft capture sensors on the guide petals, activating capture latches on the berthing system to engage mechanical latch strikers on the docking system of the target spacecraft in response to the indicator from the soft capture sensors, drawing the berthing system toward the docking system of the target spacecraft to a hard capture position, generating an indicator of contact with the docking system of the target spacecraft via hard capture sensors, and engaging hooks of the berthing system with hooks of the docking system of the target spacecraft in response to the indicator from the hard capture sensors.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
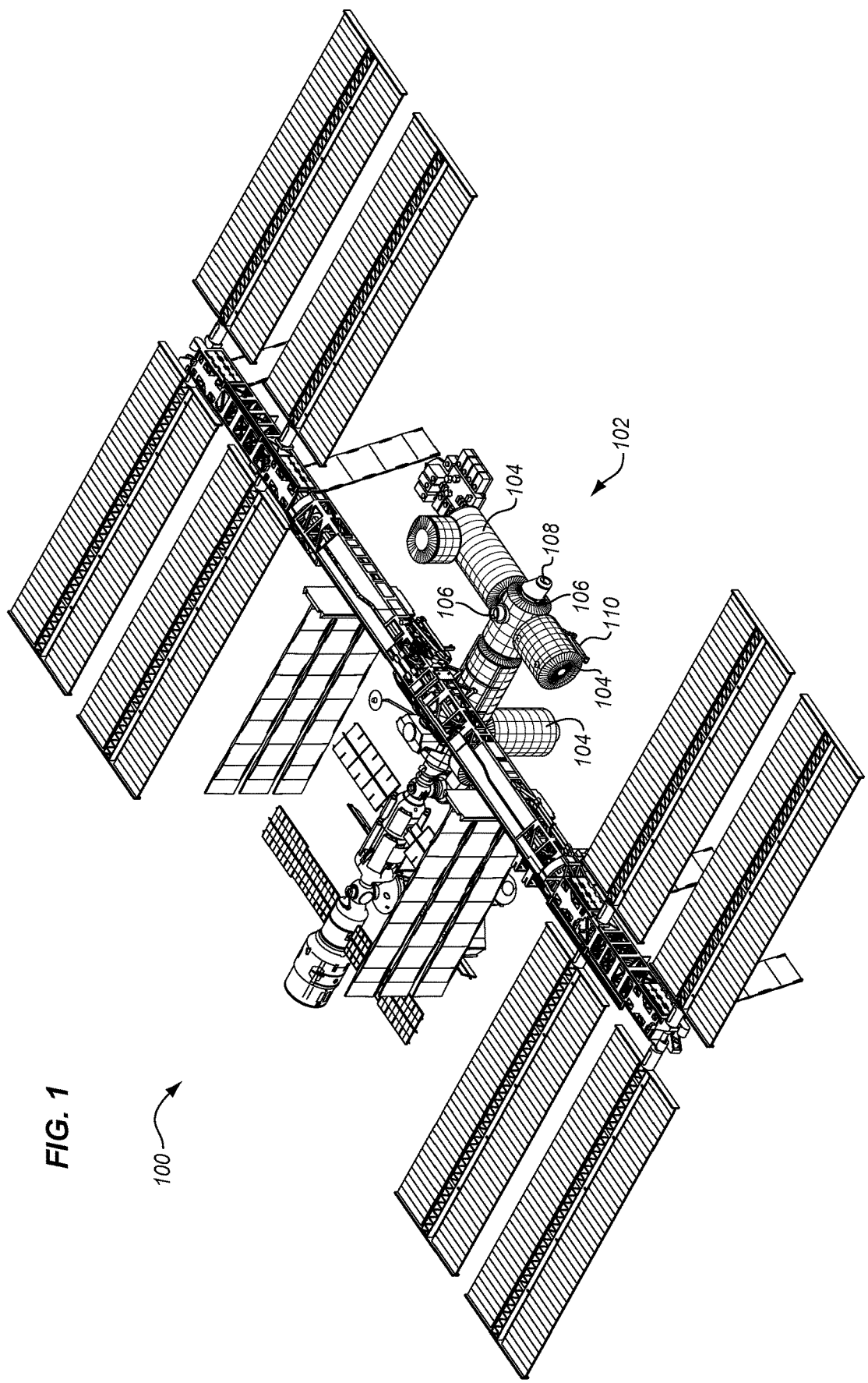
FIG. 1 is a perspective view of the International Space Station (ISS).

FIG. 1 is a perspective view of the ISS 100. One segment of ISS 100 is referred to as the US Orbital Segment (USOS) 102, which refers to the components constructed by NASA and other cooperating agencies. USOS 102 includes multiple modules 104, which are pressurized segments of USOS 102 that may be habitable. Some modules 104 are referred to as "nodes", such as Unity, Harmony, and Tranquility. Other modules 104 are laboratories, such as Density, Columbus, and Kibo. The modules 104 of USOS 102 have one or more CBMs 106, which are berthing mechanisms used to connect pressurized elements. For example, the Unity, Harmony, and Tranquility nodes have four CBMs 106 around their exterior, and one CBM 106 on each end. The CBMs 106 may be used to connect one module 104 to another. Also, one or more CBMs 106 may be converted into a docking port so that a visiting spacecraft (also referred to as a Visiting Vehicle (VV)) may park at the module 104.

To convert a CBM 106 into a docking port, a PMA 108 may be installed at the CBM 106. A PMA 108 is a spacecraft adapter that converts a CBM 106 into an Androgynous Peripheral Attach System (APAS) docking port. For example, PMA-1 is mounted to a CBM 106 on the Unity node, and PMA-2 and PMA-3 are mounted to CBMs 106 on the Harmony node (although the locations of the PMAs 108 may change over time). The IDSS has been adopted to replace APAS as the standard for docking with USOS 102. Thus, an NDS-compliant docking system or docking adapter may be attached to a PMA 108 to convert PMA 108 to an IDSS docking port. For example, an IDA is a spacecraft docking system adapter developed to convert APAS to the NDS/IDSS. An IDA may therefore be attached to a PMA 108 to form an IDSS docking port.

Figure 2:
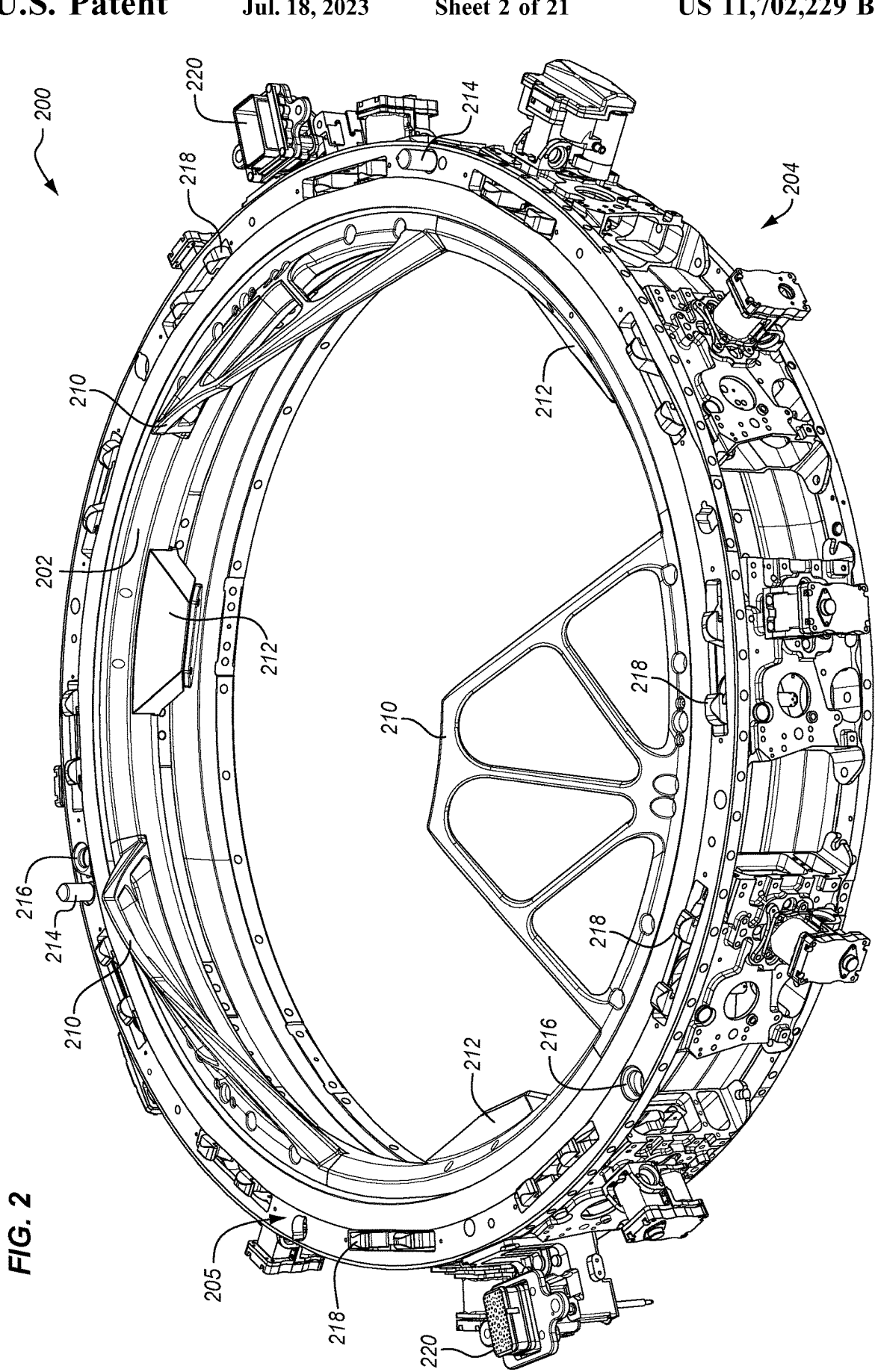
FIG. 2 is a perspective view of an International Docking Adapter (IDA).

FIG. 2 is a perspective view of an IDA 200. IDA 200 is installed on a PMA 108 of ISS 100, and is configured to mate with a corresponding NDS-compliant system (i.e., docking and/or berthing system) on a visiting spacecraft. IDA 200 includes a tunnel 202, which is generally a cylindrical structure having opposing interface surfaces 204-205. Interface surface 204 is configured to mate with a corresponding interface surface on PMA 108 (see FIG. 1). Interface surface 205 is configured to mate with a corresponding interface surface on a docking/berthing system on a visiting spacecraft. IDA 200 further includes guide petals 210, mechanical latch strikers 212, guide pins 214, guide pin receptacles 216, hooks 218, and resource umbilicals (i.e., a Power/Data Transfer Umbilical (PDTU) 220). There are three guide petals 210 connected to tunnel 202 that are equally spaced around an inner peripheral surface of tunnel 202. Guide petals 210 project axially beyond interface surface 205 and point radially inward. Guide petals 210 are the first elements of IDA 200 to make contact (i.e., initial contact) with a docking/berthing system on a visiting spacecraft. Mechanical latch strikers 212 are also spaced around the inner peripheral surface of tunnel 202 between guide petals 210. The term "striker" refers to the area on the passive side of a mating interface which is intended to be a contact surface for an active component on the active side of the mating interface. Thus, mechanical latch strikers 212 are the contact surface for a capture latch of a docking/berthing system on a visiting spacecraft. Guide pins 214 and guide pin receptacles 216 are disposed on interface surface 205, and provide alignment of IDA 200 with a docking/berthing system on a visiting spacecraft. Hooks 218 provide the structural connection and pressure seal compression between IDA 200 and a docking/berthing system on a visiting spacecraft. IDA 200 includes twelve active/passive hook pairs. PDTUs 220 are configured to mate with resource umbilicals on a docking/ berthing system on a visiting spacecraft to transfer power, data, etc. IDA 200 includes more components that not described for the sake of brevity, such as sensors, sensor strikers, reflector targets, docking targets, etc.

Figure 3:
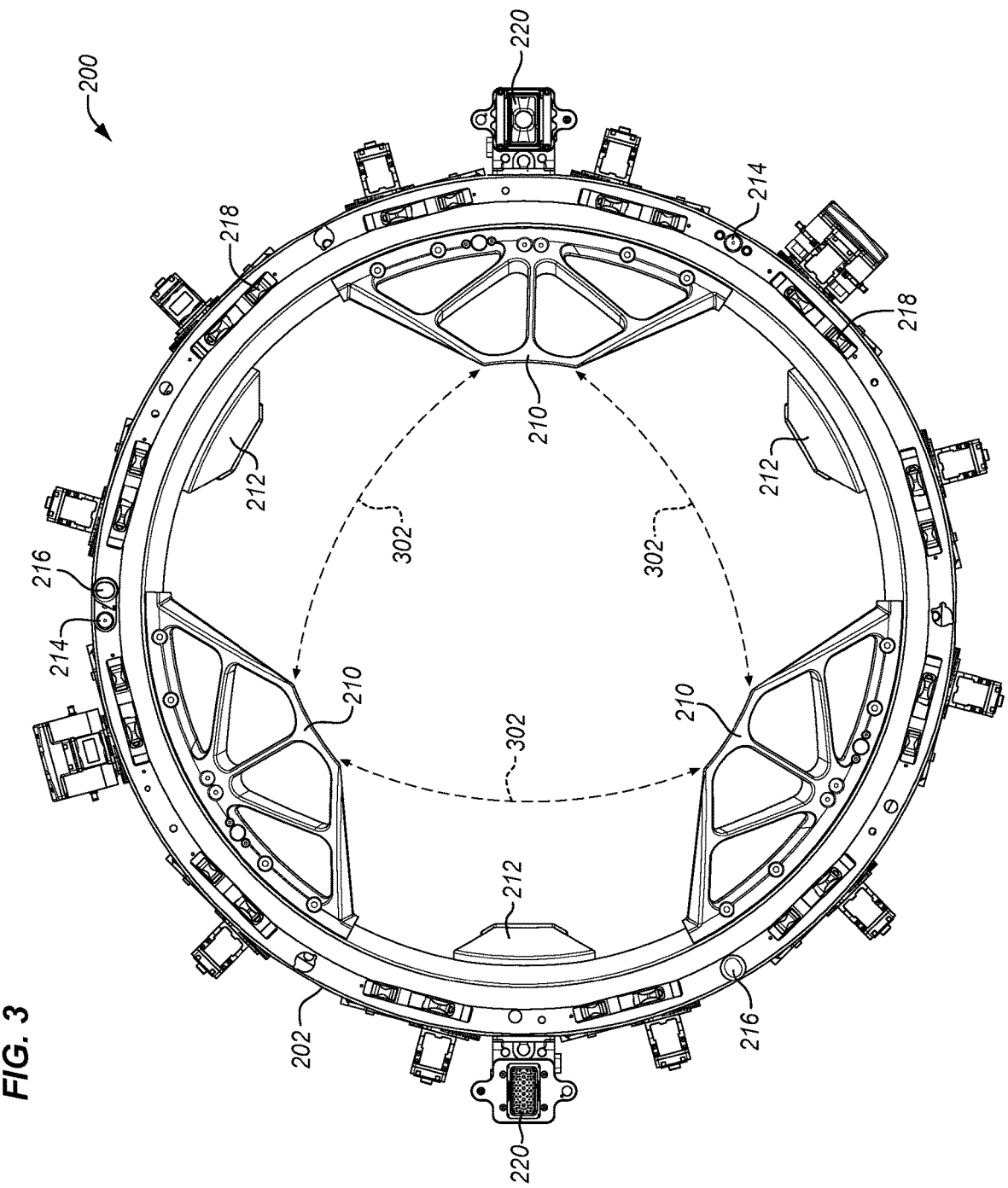
FIG. 3 is a plan view of an IDA.

FIG. 3 is a plan view of IDA 200. The view in FIG. 3 is from interface surface 205, which faces toward a docking/ berthing system on a visiting spacecraft. This view further illustrates the configuration of guide petals 210 and mechanical latch strikers 212. As described above, guide petals 210 are equally spaced around the inner peripheral surface of tunnel 202. Thus, there are circumferential gaps 302 between guide petals 210. Mechanical latch strikers 212 are spaced around the inner peripheral surface of tunnel 202 in the circumferential gaps 302 between guide petals 210.

IDA 200 allows for both docking and berthing operations. A docking operation is a process of connecting spacecraft without external assistance. In the case of docking, a Guidance, Navigation and Control (GN&C) system of the visiting spacecraft controls the entry of the visiting spacecraft into the NDS adapter (i.e., IDA 200) on ISS 100 for capture. A berthing operation is a process of connecting spacecraft with assistance. In the case of berthing, the GN&C system navigates the visiting spacecraft to a meeting point, and a manipulator (i.e., a mechanical robot arm 110 on ISS 100 as shown in FIG. 1) grasps the visiting spacecraft and transfers it to the final position for capture.

To perform a docking operation, for example, the visiting spacecraft has an active docking system that mates with IDA 200. One example of an active docking system is NDSB1. An active docking system is divided into two subsystems: an active Soft Capture System (SCS) that extends axially outward to attach with IDA 200, and a Hard Capture System (HCS). In the first stage of a docking operation, the active SCS establishes the initial (soft) capture of the visiting spacecraft and provides load attenuation. The active SCS generally includes an SCS ring, guide petals with capture latches attached to the SCS ring, and a Linear Actuator System (LAS). The LAS extends the SCS ring to align the guide petals with IDA 200, and the capture latches on the guide petals lock the SCS ring to the mechanical latch strikers 212 on IDA 200. When the soft capture is complete and after load attenuation, the LAS retracts the SCS ring to initiate the second stage of docking performed by the HCS. The HCS generally includes an HCS ring, pressure seals, guide pins/guide pin receptacles, hook pairs, etc. When the SCS ring is retracted, the docking spacecraft are pulled together until an interface surface of the active docking system on the visiting spacecraft contacts the interface surface 205 of IDA 200. The HCS performs structural latching and sealing between the active docking system and IDA 200 in order to transfer structural loads between the visiting spacecraft and ISS 100, and to create a transfer tunnel which can be pressurized for crew and cargo transfer.

Figure 4:
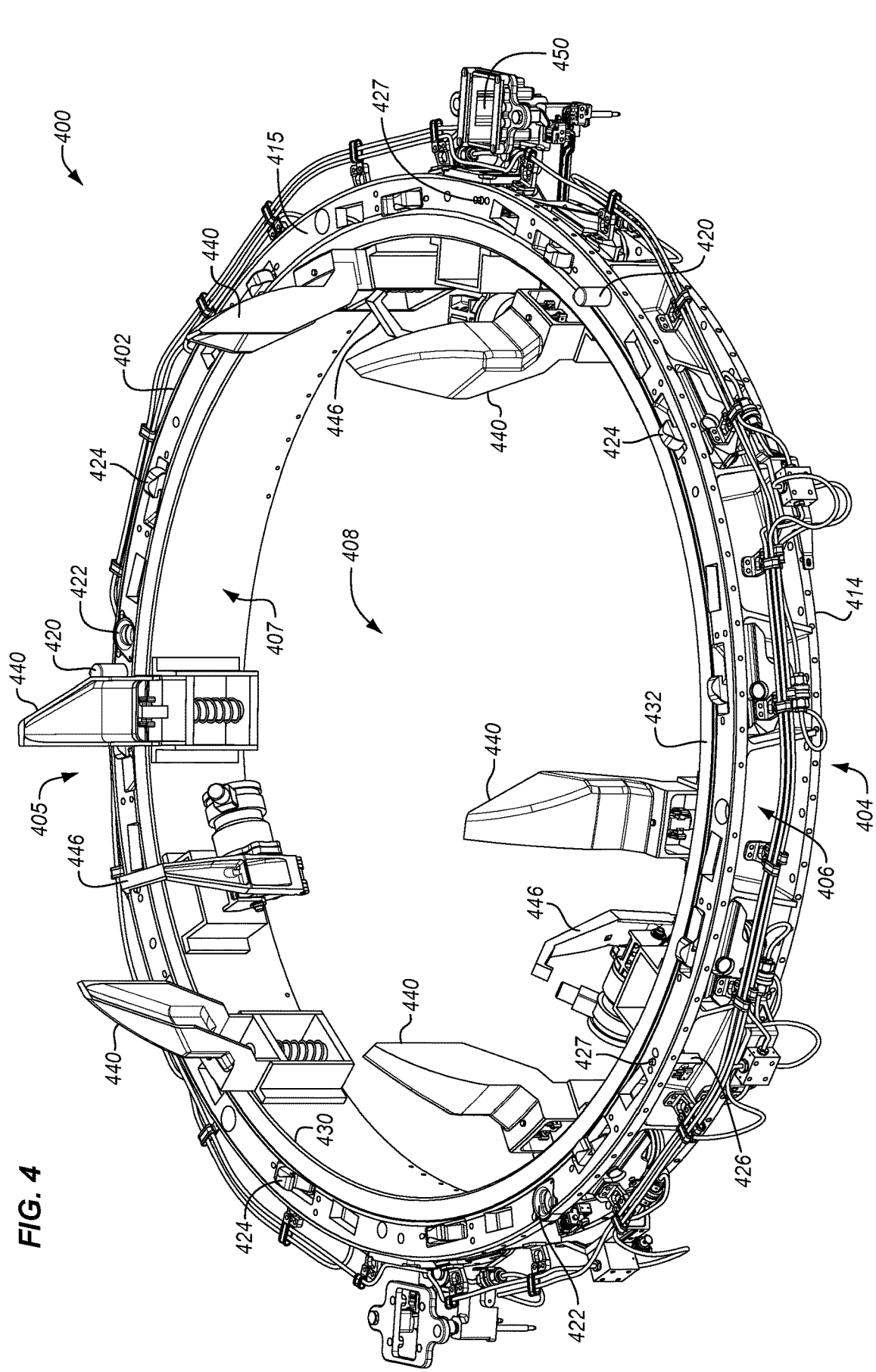
FIG. 4 is a perspective view of a berthing system in an illustrative embodiment.

In the embodiments described herein, a berthing system is disclosed for a visiting spacecraft. FIG. 4 is a perspective view of berthing system 400 in an illustrative embodiment. Berthing system 400 (also referred to as a berthing mechanism) is an NDS-compliant mechanical or electromechanical device that facilitates a connection of a visiting spacecraft to an NDS-compliant docking port of another spacecraft (e.g., ISS 100). For example, berthing system 400 may be configured to mate with IDA 200 as shown in FIG. 2 and described below. However, it is understood that berthing system 400 may be configured to mate with future generations of IDA, or with another type of docking adapter or docking system on a target spacecraft that is NDS/IDSS compliant. Berthing system 400 is configured for berthing/unberthing operations that are assisted by a manipulator, which may be referred to as manipulator-assisted berthing and unberthing. The manipulator may comprise the ISS Space Station Remote Manipulator System (SSRMS), which is illustrated by mechanical robot arm 110, or a similar future manipulator system.

Berthing system 400 includes a tunnel 402, which is the main housing of berthing system 400 for structural mating. Tunnel 402 is generally a cylindrically-shaped or annular member having opposing ends 404-405 in the axial direction, an outer peripheral surface 406 and an inner peripheral surface 407 in the radial direction, and a passageway, hollow, hole, or opening 408 bounded by inner peripheral surface 407. Tunnel 402 is made or machined from a rigid material having stiffness and hardness comparable to that of metal alloys commonly used in aerospace vehicle primary structures, such as Aluminum (e.g., a 6061 Aluminum alloy). Tunnel 402 may also be referred to as an HCS ring, as it performs structural latching and sealing. Because berthing system 400 is configured for berthing instead of docking, berthing system 400 includes a single ring (i.e., tunnel 402) and does not implement an additional SCS ring and actuators as with an active docking system (e.g., NDSB1).

End 404 represents the end of berthing system 400 that faces a visiting spacecraft, and includes an interface surface 414 that attaches to a port on the visiting spacecraft. End 405 represents the end of berthing system 400 that mates with IDA 200 on ISS 100 or another target spacecraft. End 405 includes an interface surface 415 that is generally flat, and forms a hard capture mating plane. A variety of components are disposed circumferentially on interface surface 415 for alignment and mating. For instance, guide pins 420 and guide pin receptacles 422 are disposed on interface surface 415. Guide pins 420 project in the axial direction from interface surface 415, and guide pin receptacles 422 are recessed in the axial direction from interface surface 415. Guide pins 420 are configured to mate with corresponding guide pin receptacles 216 on IDA 200 (see FIG. 2). Likewise, guide pin receptacles 422 are configured to mate with corresponding guide pins 214 on IDA 200 (see FIG. 2). Guide pins 420 and guide pin receptacles 422 are final alignment features for a hard capture. Hooks 424 are also disposed circumferentially on interface surface 415, and may project at least partially from a slot in interface surface 415. Hooks 424 are a hard capture feature configured to engage with corresponding hooks 218 on IDA 200 to provide structural latching.

One or more hard capture sensors 426 may also be disposed circumferentially at interface surface 415. Hard capture sensors 426 are configured to indicate contact with IDA 200 (or another docking system of a target spacecraft). Hard capture sensors 426 include a sensor rod 427 that projects axially from interface surface 415, and is configured to be compressed by force from an opposing interface surface 205 of IDA 200 (see FIG. 2). Hard capture sensors 426 generate a signal or indicator when sensor rod 427 is compressed due to contact with IDA 200. Hard capture sensors 426 may be referred to as "Ready-to-Hook" indicators, as signals from hard capture sensors 426 may be used to indicate that hooks 424 are ready for engagement.

The guide pins 420, guide pin receptacles 422, hooks 424, and hard capture sensors 426 are generally disposed on an outer radial portion of interface surface 415. The inner radial portion of interface surface 415 includes a seal groove 430 formed in and around the cylindrically-shaped interface surface 415. One or more pressure seals 432 are disposed on interface surface 415 in seal groove 430. For example, pressure seals 432 may comprise two concentric pressure seals that accommodate seal-on-seal mating. Pressure seals 432 are located radially inward from hooks 424. The diametral dimensions of pressure seals 432 are IDSS compliant.

Berthing system 400 further includes a plurality of guide petals 440 that are spaced around inner peripheral surface 407 of tunnel 402. Guide petals 440 project in the axial direction beyond interface surface 415, and generally point radially inward. Guide petals 440 are soft capture features that make initial contact with IDA 200. The locations and numbers of guide petals 440 shown in FIG. 4 is just an example, and may vary as desired. To act as soft capture features, guide petals 440 are slidably mounted to tunnel 402 in the axial direction. As will be described in more detail below, guide petals 440 project a distance beyond interface surface 415 via application of an axial force provided by elastic members, such as springs, when guide petals 440 are in a soft capture state (i.e., as shown in FIG. 4). Thus, guide petals 440 may be referred to as "spring-loaded" guide petals in one embodiment. When guide petals 440 make initial contact with IDA 200 in the soft capture state, guide petals 440 are configured to slide in the axial direction toward interface surface 415. Guide petals 440 are mounted directly to tunnel 402 (as part of guide petal assemblies as will be described below), as opposed to being mounted on an extendible SCS ring of an active docking system. Each of the guide petals 440 is configured to independently slide in the axial direction.

Berthing system 400 further includes a plurality of capture latches 446 spaced around inner peripheral surface 407 of tunnel 402. Capture latches 446 are a type of mechanical latch configured to engage the mechanical latch strikers 212 of IDA 200. Thus, the locations of capture latches 446 correspond with the locations of mechanical latch strikers 212 of IDA 200.

Berthing system 400 may further include one or more resource umbilicals 450 configured to engage with PDTU 220 on IDA 200. Resource umbilicals 450 are configured to transfer resources between two docked spacecraft. For example, resource umbilicals 450 may transfer power, data, and a ground safety wire. Resource umbilicals 450 may also transfer water, fuel, tank pressurization, etc. The connectors of resource umbilicals 450 may be recessed below the hard capture mating plane during berthing, and then are driven to mate after hard capture occurs.

Figure 5:
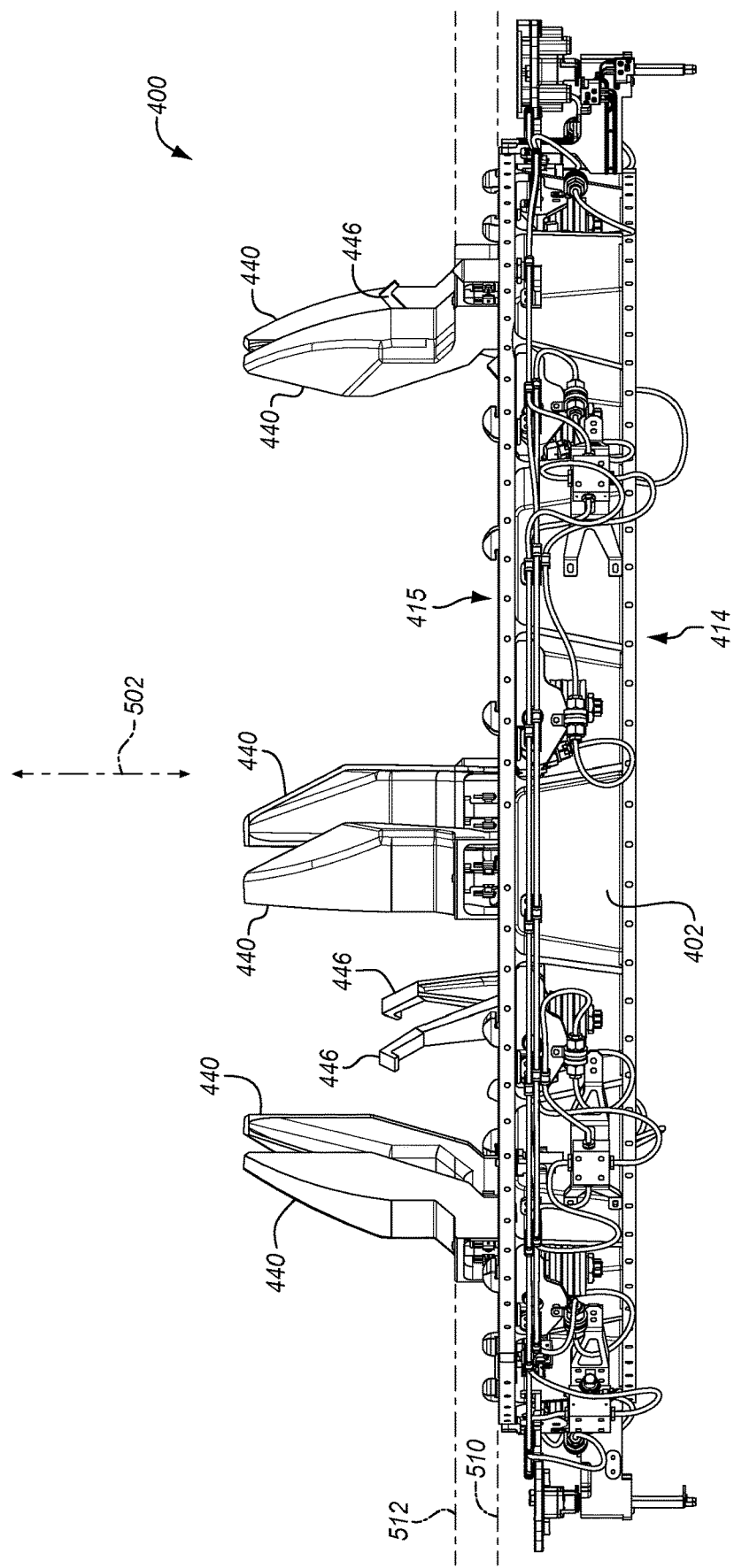
FIG. 5 is a side view of a berthing system in an illustrative embodiment.

FIG. 5 is a side view of berthing system 400 in an illustrative embodiment. As is evident in this figure, guide petals 440 project in the axial direction 502 beyond interface surface 415, and point radially inward. Interface surface 415 defines the hard capture mating plane 510. The hard capture mating plane 510 is defined as the seal plane between tunnel 402 and tunnel 202 of IDA 200 when structurally mated. Guide petals 440 define the soft capture mating plane 512 that is axially outward from interface surface 415 (i.e., away from interface surface 415). For example, the soft capture mating plane 512 may be about two inches above the hard capture mating plane 510.

Figure 6:
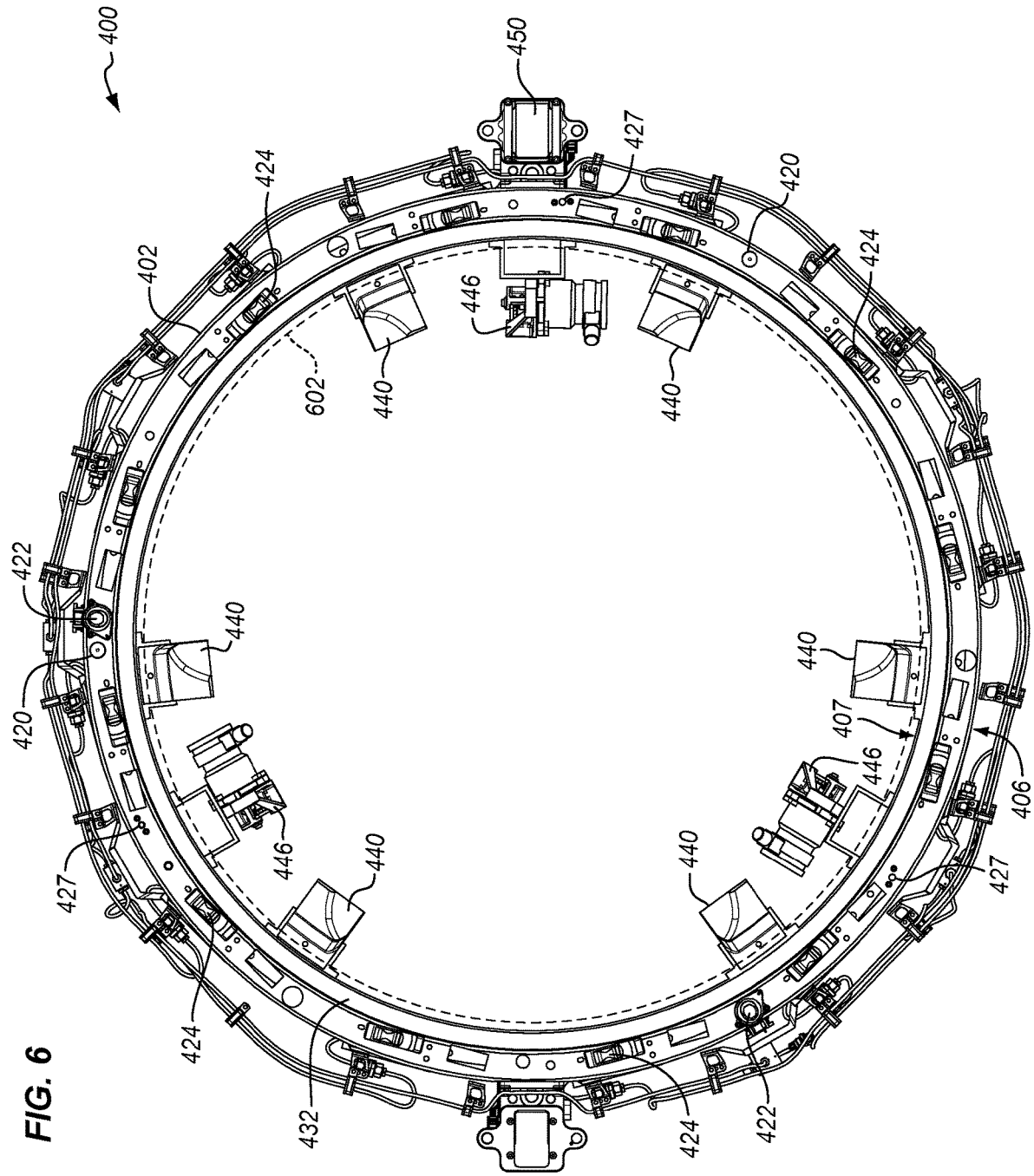
FIG. 6 is a plan view of a berthing system in an illustrative embodiment.

FIG. 6 is a plan view of berthing system 400 in an illustrative embodiment. The view in FIG. 6 is of interface surface 415, which faces toward IDA 200 in a berthing operation. This view shows guide petals 440 and capture latches 446 are spaced around inner peripheral surface 407 of tunnel 402. Due to the spacing of guide petals 440, the outer radial surfaces of guide petals 440 form a conic outline 602. The conic outline 602 is less than the diameter of tunnel 402, and generally corresponds with the inner diameter of tunnel 202 of IDA 200.

In one embodiment, one or more guide petals 440 (or more particularly, guide petal assemblies as described below) and a capture latch 446 are arranged along inner peripheral surface 407. For example, a capture latch 446 may be interposed between a pair of guide petals 440 as a grouping. The locations of the groupings of guide petals 440 and capture latches 446 correspond with the circumferential gaps 302 between guide petals 210 of IDA 200. Thus, guide petals 440 and capture latches 446 of berthing system 400 do not interfere with guide petals 210 of IDA 200 during a berthing operation.

Figure 7:
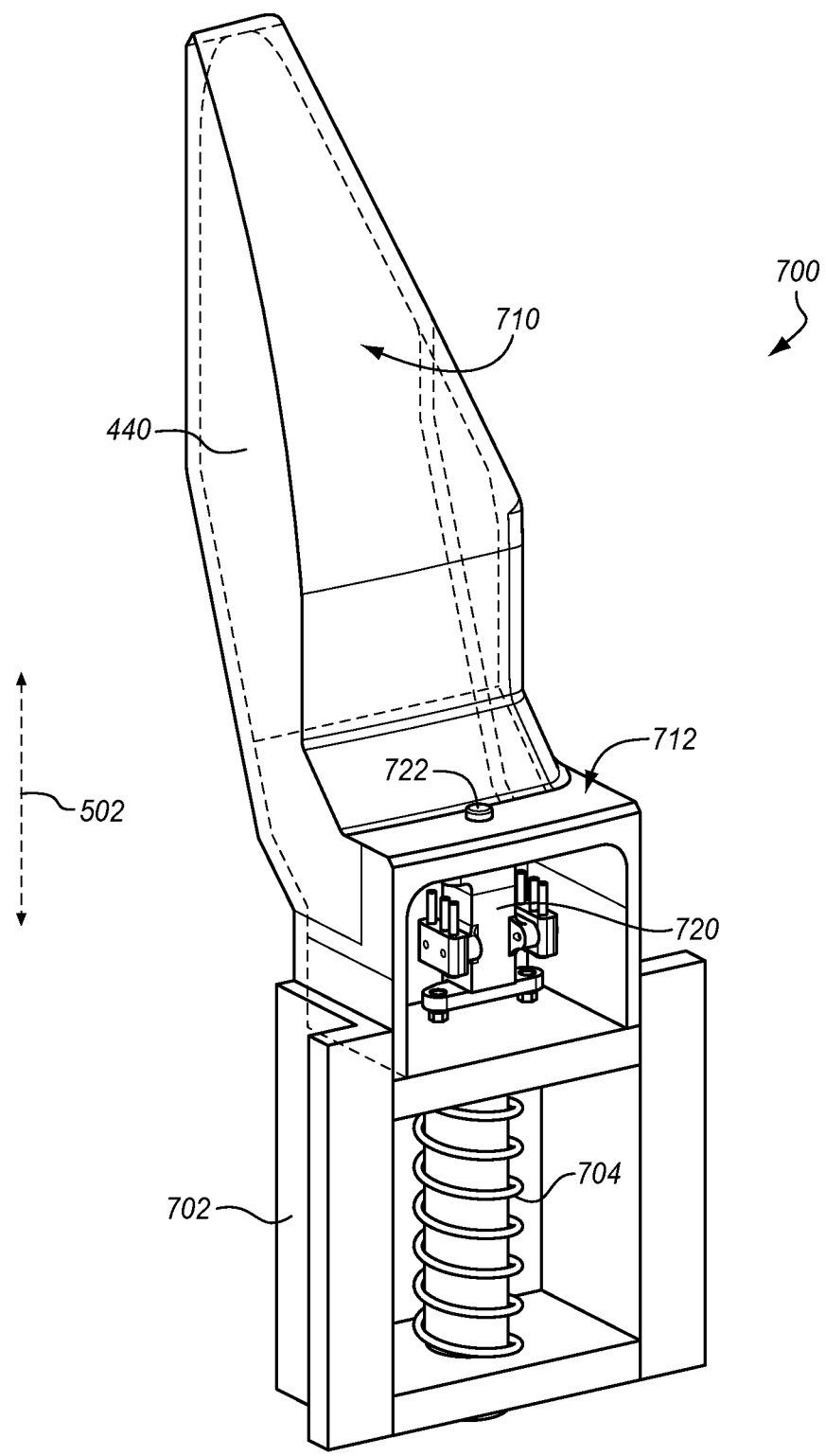
FIG. 7 is a perspective view of a guide petal assembly in an illustrative embodiment.

FIG. 7 is a perspective view of a guide petal assembly 700 in an illustrative embodiment. Guide petal assembly 700 includes a guide petal 440, a mounting member 702, and one or more elastic members 704. Mounting member 702 is configured to attach to inner peripheral surface 407 of tunnel 402. For example, mounting member 702 may be welded, bolted, or otherwise affixed to tunnel 402. Guide petal 440 is slidably coupled to or mounted on mounting member 702 so that guide petal 440 may slide axially with respect to mounting member 702 and tunnel 402. Elastic member 704 is configured to apply a force on guide petal 440 in the axial direction 502 to push guide petal 440 away from interface surface 415 (upward in FIG. 7).

Guide petal 440 is an elongated member that includes a contact surface 710 and a petal base 712. The structure of guide petal 440 may be derived from a Modified-APAS (MAPAS) guide petal, which is a proven technology used for mating operations. Contact surface 710 is angled, contoured, curved, or otherwise shaped radially inward. The entirety of contact surface 710 is generally smooth so that IDA 200 and berthing system 400 may slide against each other to assist in initial alignment during soft capture. Guide petal 440 may be referred to as a passive guide petal, as no capture latches are implemented on contact surface 710 of guide petal 440.

Contact surface 710 and guide petal 440 are configured for alignment, and do not include components for latching. Petal base 712 is a generally planar surface that is parallel to interface surface 415 of tunnel 402. Petal base 712 is situated above interface surface 415 in the axial direction 502 when guide petal 440 is in a soft capture state (i.e., as shown in FIG. 7). The plane of petal base 712 defines the soft capture mating plane 512.

Guide petal assembly 700 may further include a soft capture sensor 720 installed at petal base 712. Soft capture sensor 720 is configured to indicate contact with IDA 200 (or another docking system of a target spacecraft). Soft capture sensor 720 includes a sensor rod 722 that projects axially from petal base 712, and is configured to be compressed by force from an opposing interface surface 205 of IDA 200 (see FIG. 2). Soft capture sensor 720 generates a signal or indicator when sensor rod 722 is compressed due to contact with IDA 200.

Figure 8:
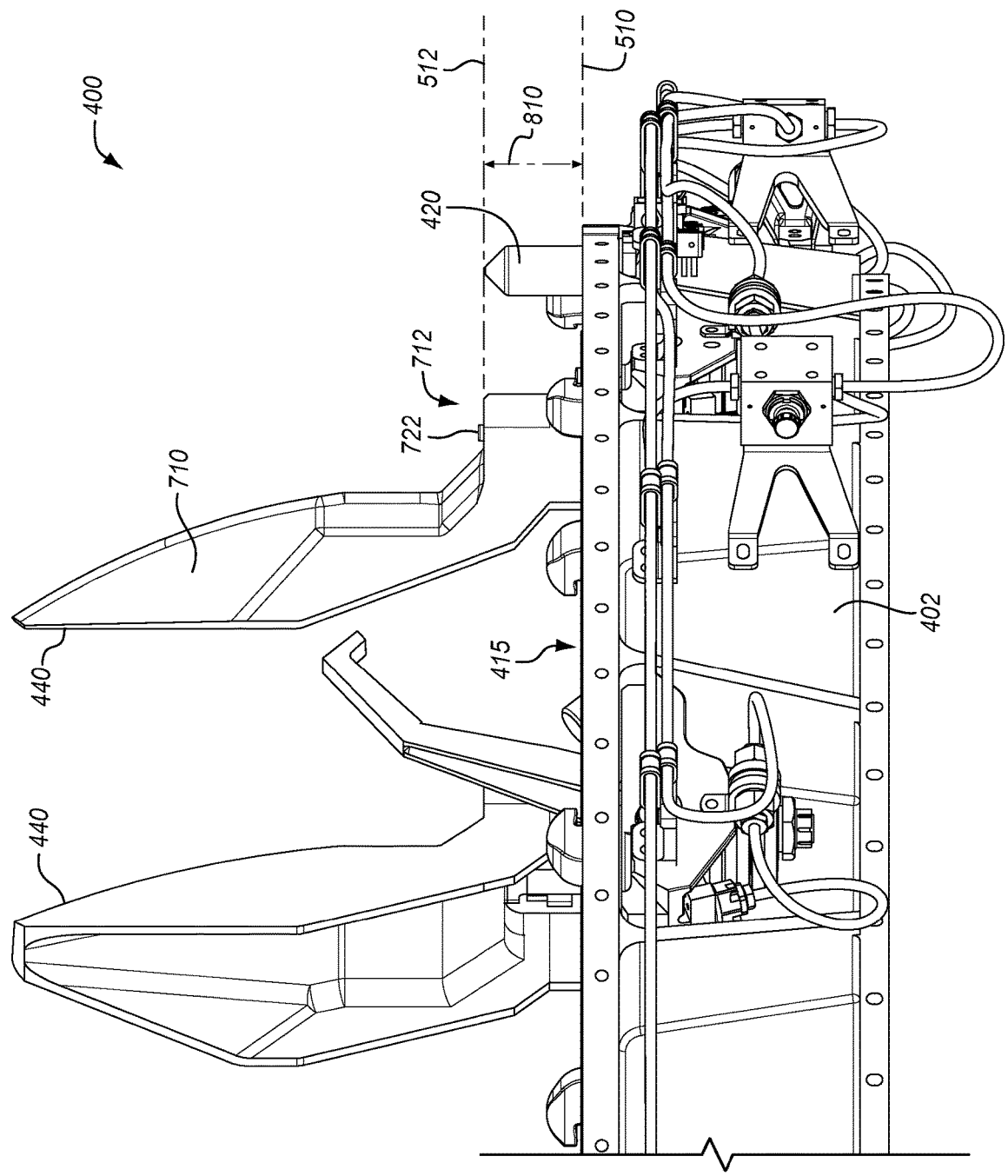
FIG. 8 is a magnified side view of a berthing system in an illustrative embodiment.
Figure 9:
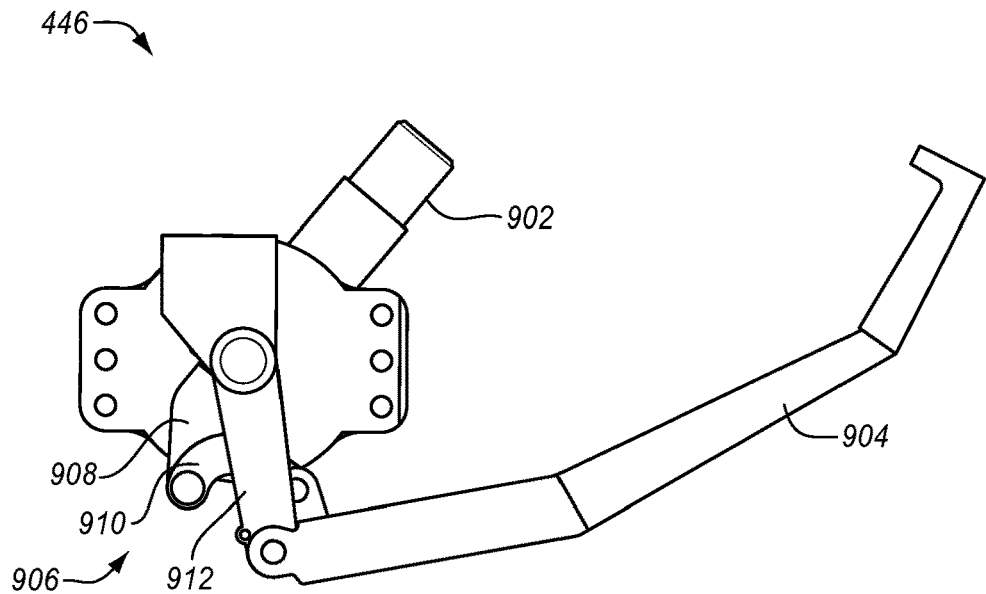
FIGS. 9-12 are side views of a capture latch in an illustrative embodiment.
Figure 10:
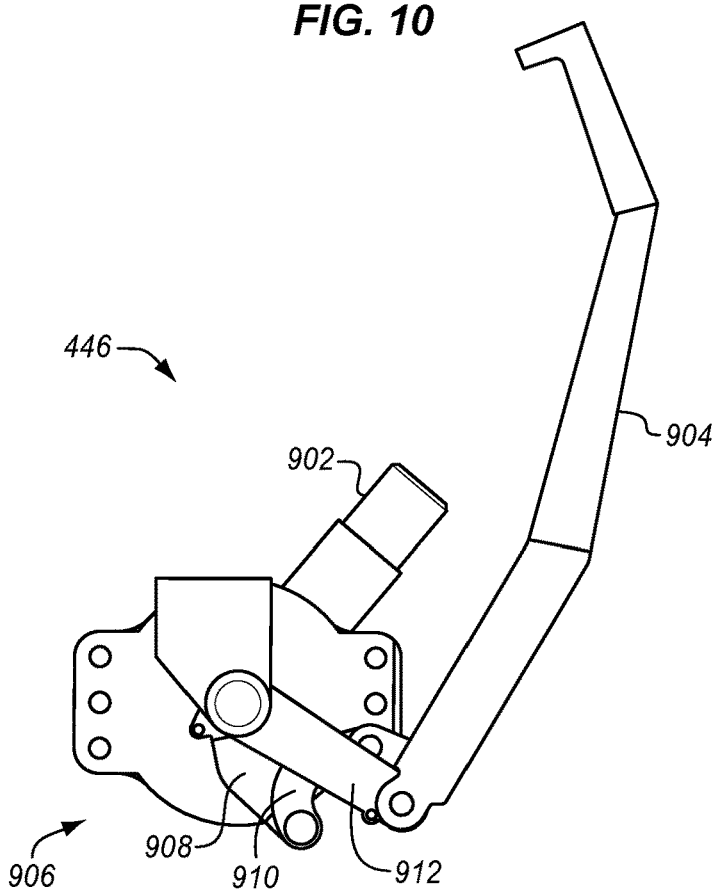
Figure 11:
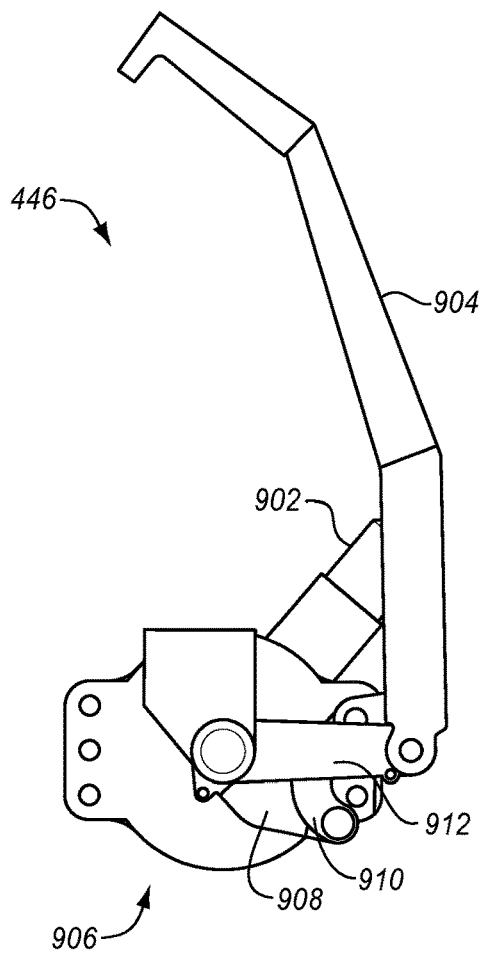

FIG. 8 is a magnified side view of berthing system 400 in an illustrative embodiment. As described above, interface surface 415 of tunnel 402 defines the hard capture mating plane 510, and petal base 712 of the guide petals 440 define the soft capture mating plane 512. The soft capture mating plane 512 is axially raised above interface surface 415. FIG. 8 also shows that the length 810 of guide pin 420 above interface surface 415 corresponds with a distance between the hard capture mating plane 510 and the soft capture mating plane 512. For example, the soft capture mating plane 512 may be about two inches above the hard capture mating plane 510, so the height of guide pin 420 may be about two inches.

Figure 12:
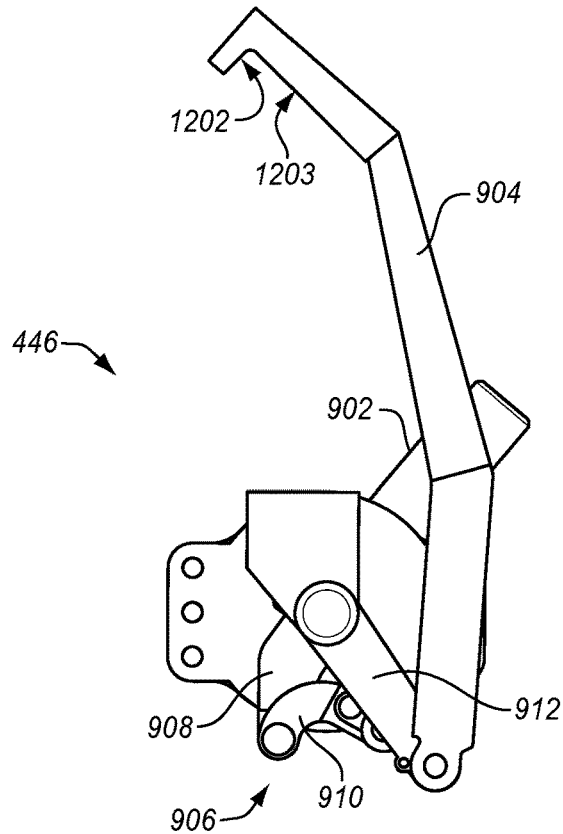

FIGS. 9-12 are side views of a capture latch 446 in an illustrative embodiment. Capture latch 446 is configured to provide a mechanical linkage between tunnel 402 of berthing system 400, and tunnel 202 of IDA 200. Capture latch 446 includes a latch actuator 902 that is mechanically linked to a latch arm 904 by a linkage 906 that may include a first drive bar 908, an idle bar 910, and a second drive bar 912. Through this linkage 906, capture latch 446 is configured to open (see FIG. 9) and extend (see FIG. 10) to position latch arm 904 proximate to a mechanical latch striker 212 of IDA 200. Capture latch 446 is further configured to close (see FIG. 11) so that latch arm 904 engages with a mechanical latch striker 212 of IDA 200. Capture latch 446 is further configured to retract (see FIG. 12), which provides a force to draw berthing system 400 toward IDA 200. As illustrated in FIG. 12, latch arm 904 includes contact surfaces 1202-1203 that match the dimensions of mechanical latch striker 212, which is IDSS/NDS compliant. Although the dimensions of a mechanical latch striker 212 may vary, in one embodiment, there may be an angle of about 90 degrees between contact surfaces 1202-1203. The transition between contact surfaces 1202-1203 may be rounded, and the length of contact surface 1203 may be about 114 cm. The structure of capture latch 446 may be a modified version of a CBM capture latch, which is a proven technology used for mating operations.

Figure 13:
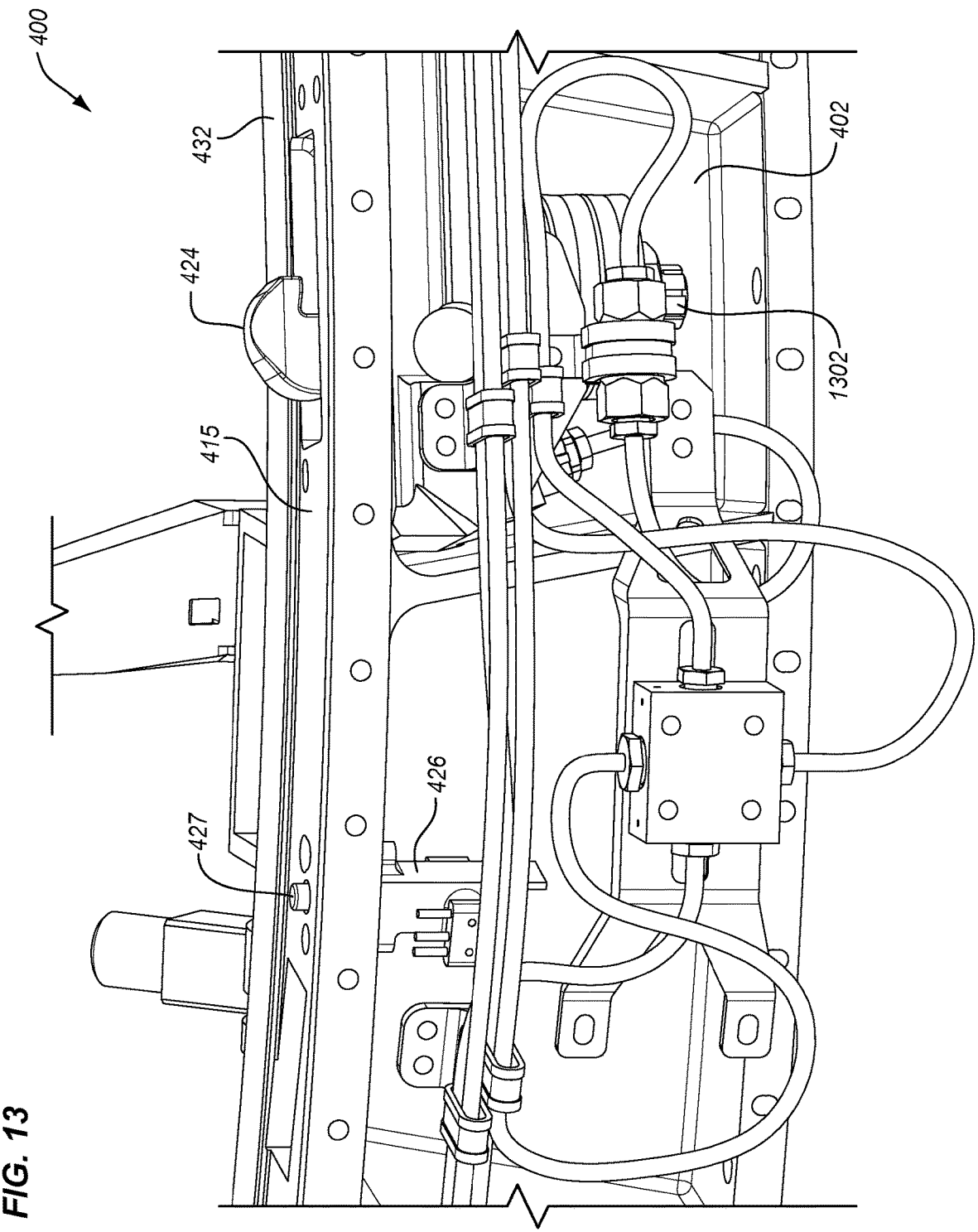
FIG. 13 is a magnified side view of a berthing system in an illustrative embodiment.

FIG. 13 is a magnified side view of berthing system 400 in an illustrative embodiment. This view further illustrates a hard capture sensor 426 and hooks 424 that are disposed on an outer radial portion of interface surface 415. Sensor rod 427 of hard capture sensor 426 projects axially from interface surface 415, and is configured to be compressed by force from an opposing interface surface 205 of IDA 200 (see FIG. 2). When sensor rod 427 is compressed, hard capture sensor 426 generates a signal or indicator that hook 424 is ready for engagement. In other words, a signal from hard capture sensor 426 indicates tunnel 402 of berthing system 400 and tunnel 202 of IDA 200 are within the capture envelope of hook 424 and a corresponding hook 218 on IDA 200. FIG. 13 also shows that hook 424 may include a pyrotechnic bolt 1302 or another pyrotechnic mechanism configured to lease hook 424 for contingency unberthing. In the event of failure to release hook 424 from a corresponding hook 218 of IDA 200, pyrotechnic bolt 1302 may be fired to release the hooks. Each hook 424 of berthing system 400 may include a pyrotechnic bolt 1302.

Figure 14:
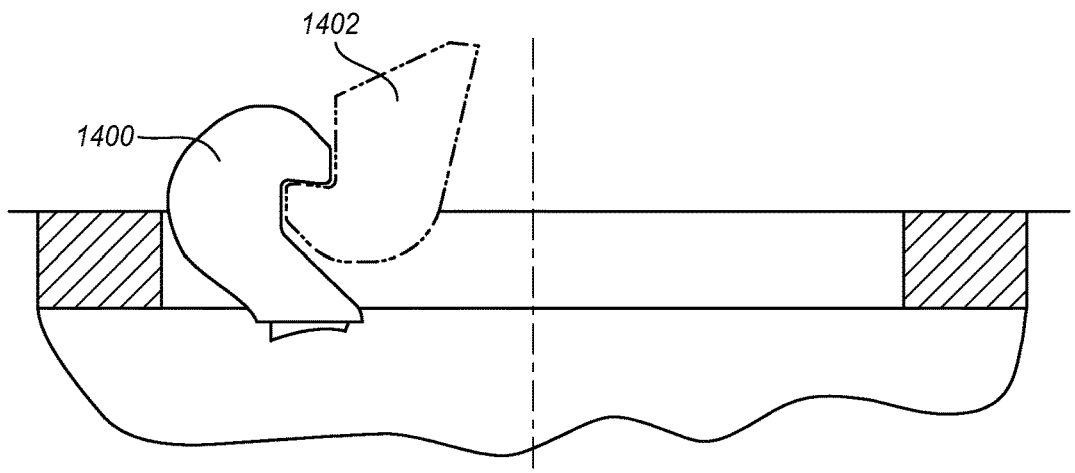
FIG. 14 is a cross-sectional view of a passive hook on a berthing system in an illustrative embodiment.
Figure 15:
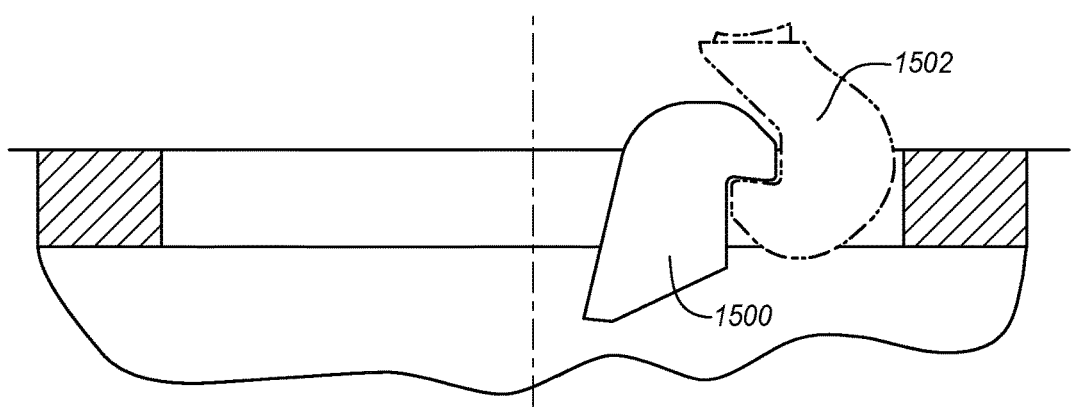
FIG. 15 is a cross-sectional view of an active hook on a berthing system in an illustrative embodiment.
Figure 16:
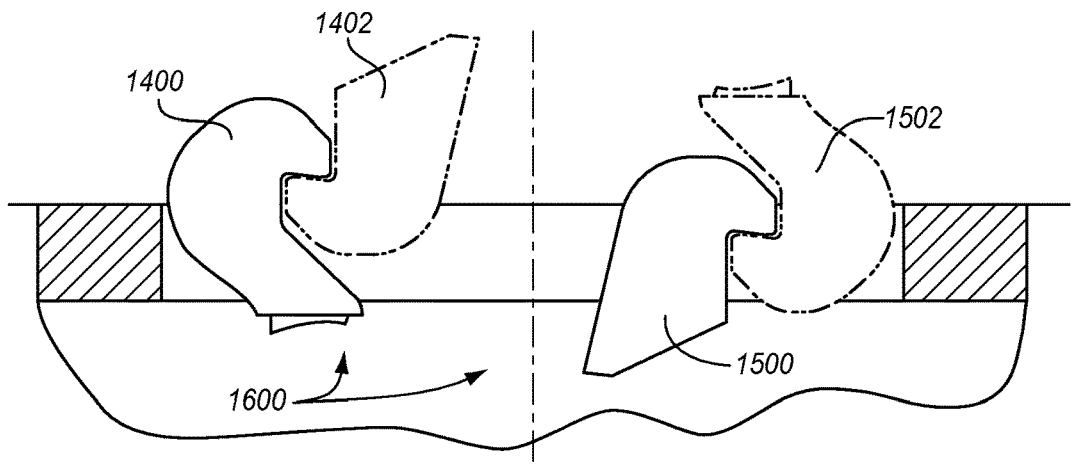
FIG. 16 is a cross-sectional view of a pair of active and passive hooks on a berthing system in an illustrative embodiment.
Figure 25:
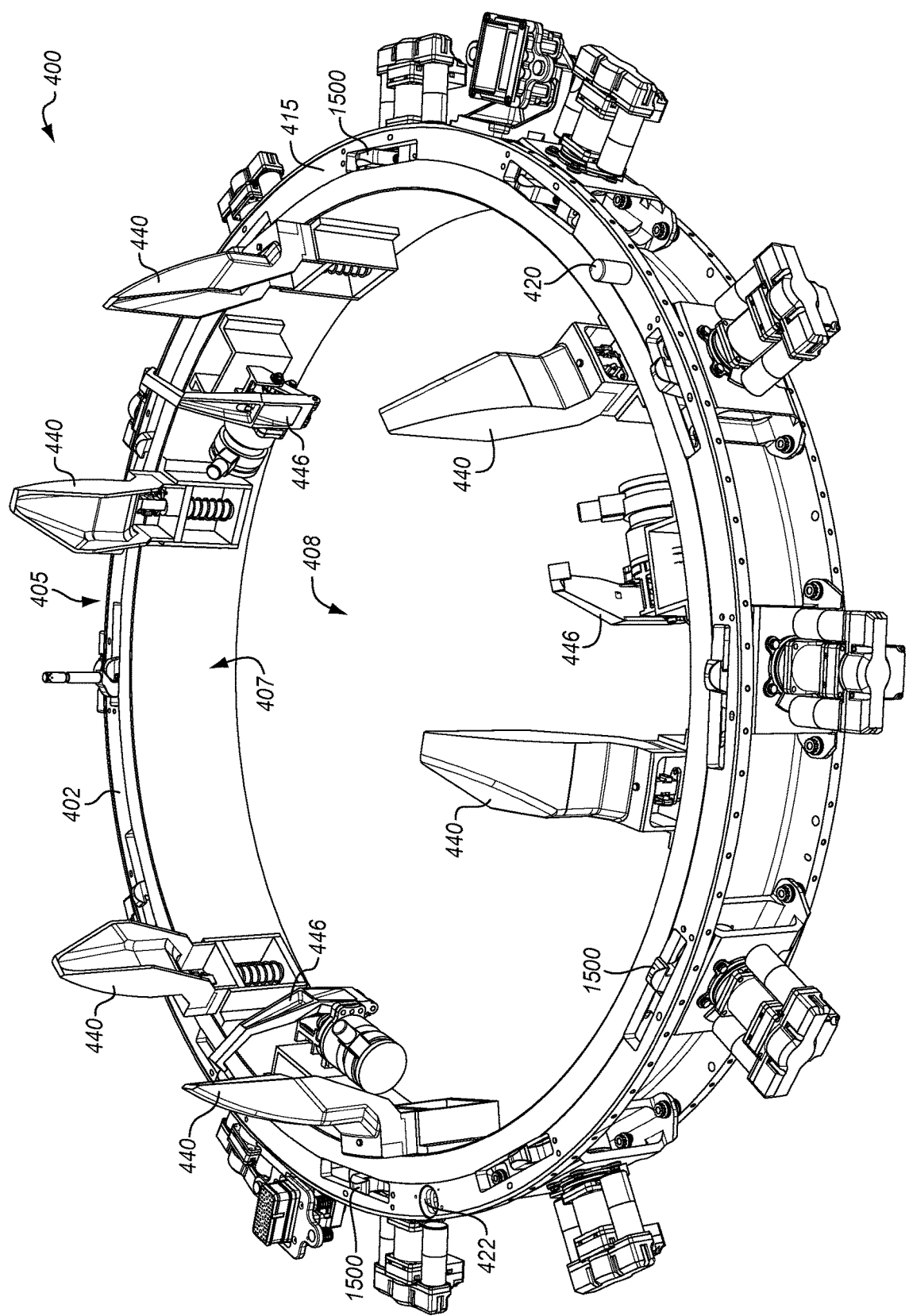
FIG. 25 is a perspective view of a berthing system in another illustrative embodiment.

FIGS. 14-16 are cross-sectional views of hooks 424. In one embodiment, hooks 424 of berthing system 400 may comprise passive hooks configured to engage with active hooks on IDA 200. FIG. 14 is a cross-sectional view of a passive hook 1400 on berthing system 400 in an illustrative embodiment. Passive hook 1400 has a particular size and dimensions as defined by IDSS to be passively compliant. Passive hook 1400 is shown as engaged with a corresponding active hook 1402 of IDA 200 (i.e., one of hooks 218 as shown in FIG. 2) to form an active hook engagement. With this configuration, active hooks may be excluded from berthing system 400, such as to save weight. In another embodiment, hooks 424 of berthing system 400 may comprise active hooks configured to engage with passive hooks on IDA 200. FIG. 15 is a cross-sectional view of an active hook 1500 on berthing system 400 in an illustrative embodiment. Active hook 1500 has a particular size, dimensions, and motion envelope as defined by IDSS to be actively compliant. Active hook 1500 is shown as engaged with a corresponding passive hook 1502 of IDA 200 (i.e., one of hooks 218 as shown in FIG. 2) to form an active hook engagement. FIG. 25 shows berthing system 400 implemented with active hooks 1500. In another embodiment, hooks 424 of berthing system 400 may comprise pairs of active and passive hooks. FIG. 16 is a cross-sectional view of a pair 1600 of active and passive hooks on berthing system 400 in an illustrative embodiment. Passive hook 1400 of pair 1600 is shown as engaged with a corresponding active hook 1402 of IDA 200, and active hook 1500 of pair 1600 is shown as engaged with a corresponding passive hook 1502 of IDA 200 to form active hook engagements.

Figure 17:
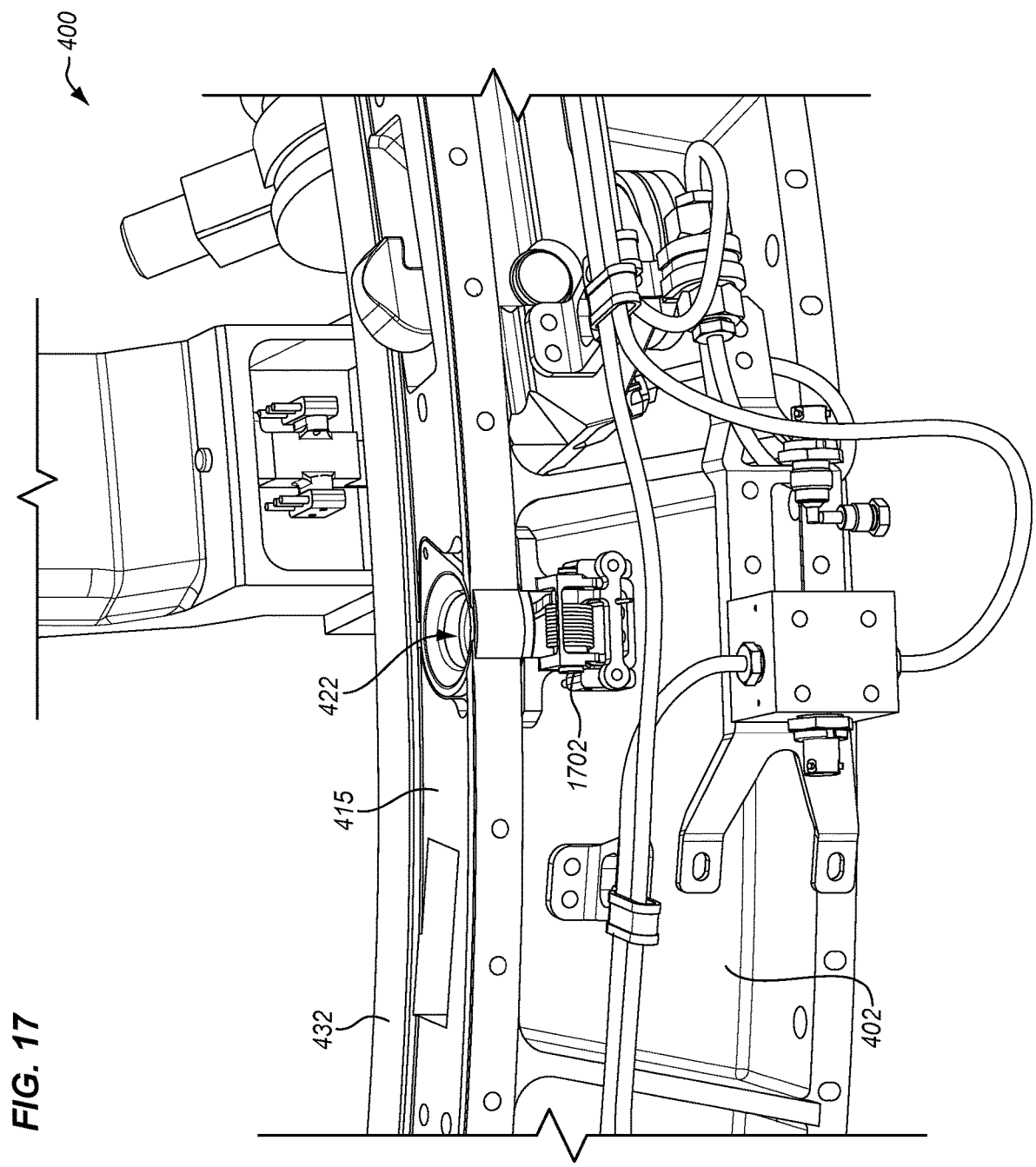
FIG. 17 is a magnified side view of a berthing system in an illustrative embodiment.

FIG. 17 is a magnified side view of berthing system 400 in an illustrative embodiment. This view shows a guide pin receptacle 422 that is recessed from interface surface 415. When berthing system 400 is mated with IDA 200, a guide pin 214 of IDA 200 will engage guide pin receptacle 422 of berthing system 400. An unberthing complete sensor 1702 is disposed at guide pin receptacle 422 (and other guide pin receptacles 422), and the guide pin 214 of IDA 200 contacts or engages unberthing complete sensor 1702 when berthing system 400 is mated with IDA 200. When berthing system 400 is unberthed from IDA 200, the guide pin 214 of IDA 200 will disengage from unberthing complete sensor 1702 and guide pin receptacle 422. Thus, unberthing complete sensor 1702 is configured to indicate when the guide pin 214 disengages from the guide pin receptacle 422. Each guide pin receptacle 422 may have an unberthing complete sensor 1702 as shown in FIG. 17.

Berthing system 400 provides technical benefits in that a system designed around berthing has reduced weight as compared to an active docking system. Berthing system 400 also has reduced complexity because an active SCS is not needed, which may improve reliability, and avoid the need for avionics to perform docking operations. This means that berthing system 400 may be installed on a wider range of spacecraft. Berthing system 400 may also provide an increased passageway diameter, which allows for an increased cargo transfer capability.

Figure 18:
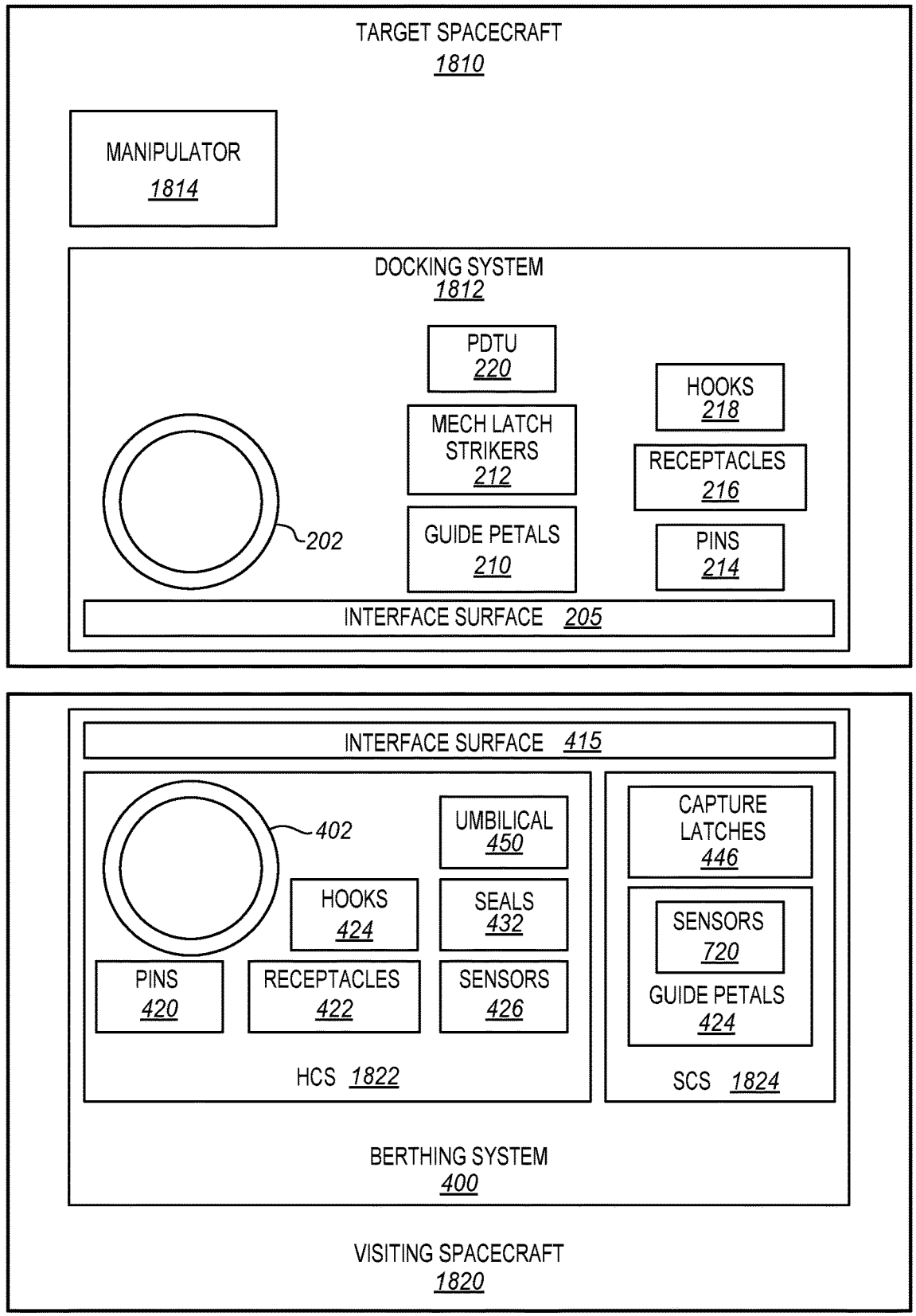
FIG. 18 is a block diagram of a berthing system on a visiting spacecraft and a docking system on a target spacecraft in an illustrative embodiment.

The following describes an example of a berthing operation using berthing system 400. FIG. 18 is a block diagram of a target spacecraft 1810 and a visiting spacecraft 1820 in an illustrative embodiment. Target spacecraft 1810 may comprise the ISS 100 as shown in FIG. 1, or another spacecraft having a docking system 1812. Docking system 1812 on target spacecraft 1810 is an IDSS/NDS compliant system, such as IDA 200 (see FIG. 2). Thus, docking system 1812 may include components as described above for IDA 200, such as tunnel 202, guide petals 210, mechanical latch strikers 212, guide pins 214, guide pin receptacles 216, hooks 218, PDTU 220, etc. Target spacecraft 1810 also includes a manipulator 1814, which comprises a robot arm configured to assist in berthing operations and other operations. Some examples of manipulator 1814 are SSRMS and Special Purpose Dexterous Manipulator (SPDM).

Visiting spacecraft 1820 is a spacecraft that docks with target spacecraft 1810. Visiting spacecraft 1820 includes berthing system 400 as described above. The hard capture components of berthing system 400 are shown in HCS 1822. HCS 1822 includes tunnel 402, hooks 424, pressure seals 432, guide pins 420, guide pin receptacles 422, hard capture sensors 426, resource umbilicals 450, etc. The soft capture components of berthing system 400 are shown in SCS 1824, which include guide petals 440 and capture latches 446.

Figure 19:
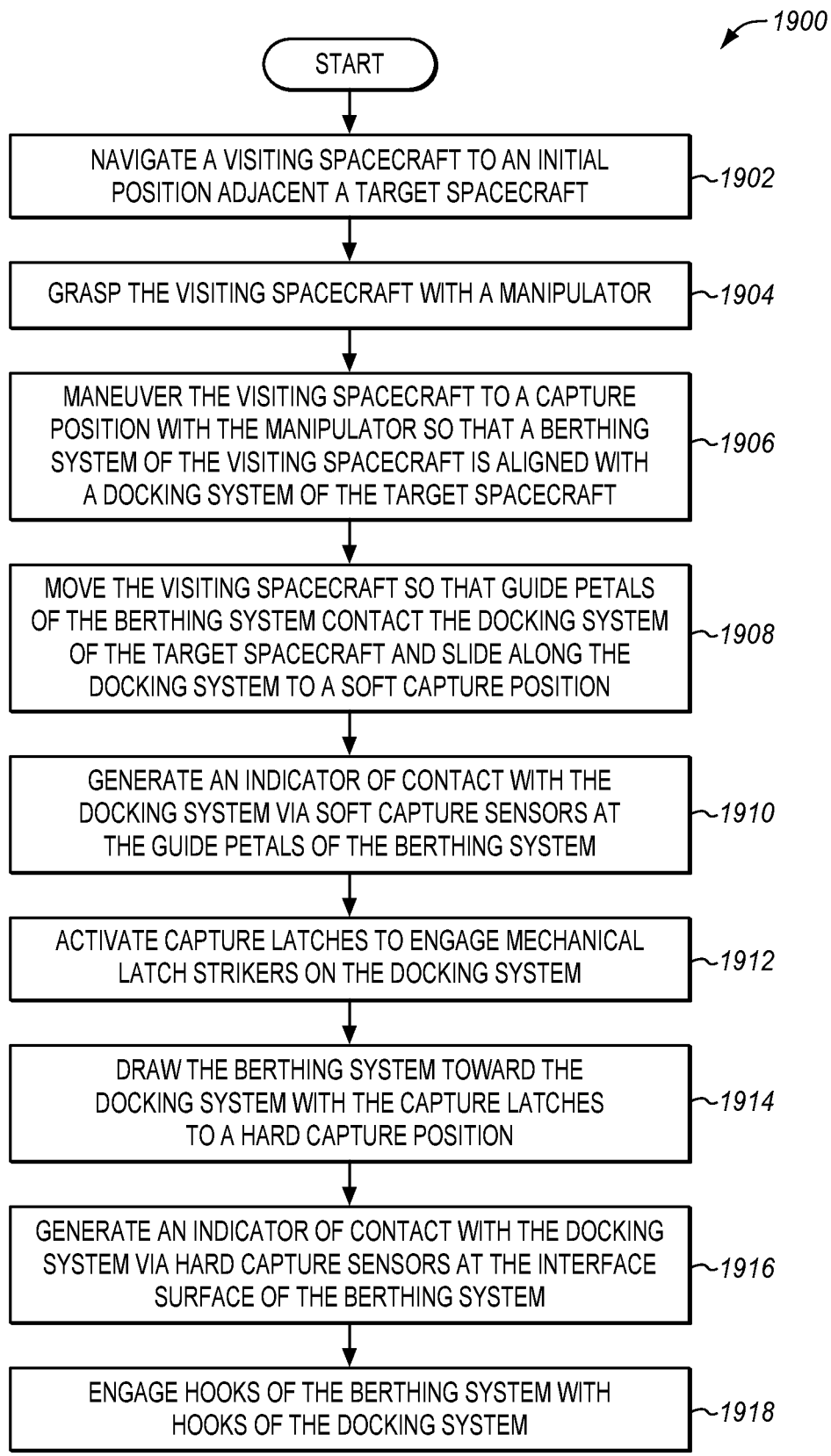
FIG. 19 is a flow chart illustrating a method of performing a berthing operation of a visiting spacecraft in an illustrative embodiment.

FIG. 19 is a flow chart illustrating a method 1900 of performing a berthing operation of visiting spacecraft 1820 in an illustrative embodiment. The steps of method 1900 will be described with respect to visiting spacecraft 1820 and target spacecraft 1810 of FIG. 18, although one skilled in the art will understand that the methods described herein may be performed on other types of spacecraft. The steps of the methods described herein are not all inclusive and may include other steps not shown. The steps for the flow charts shown herein may also be performed in an alternative order.

Figure 20:
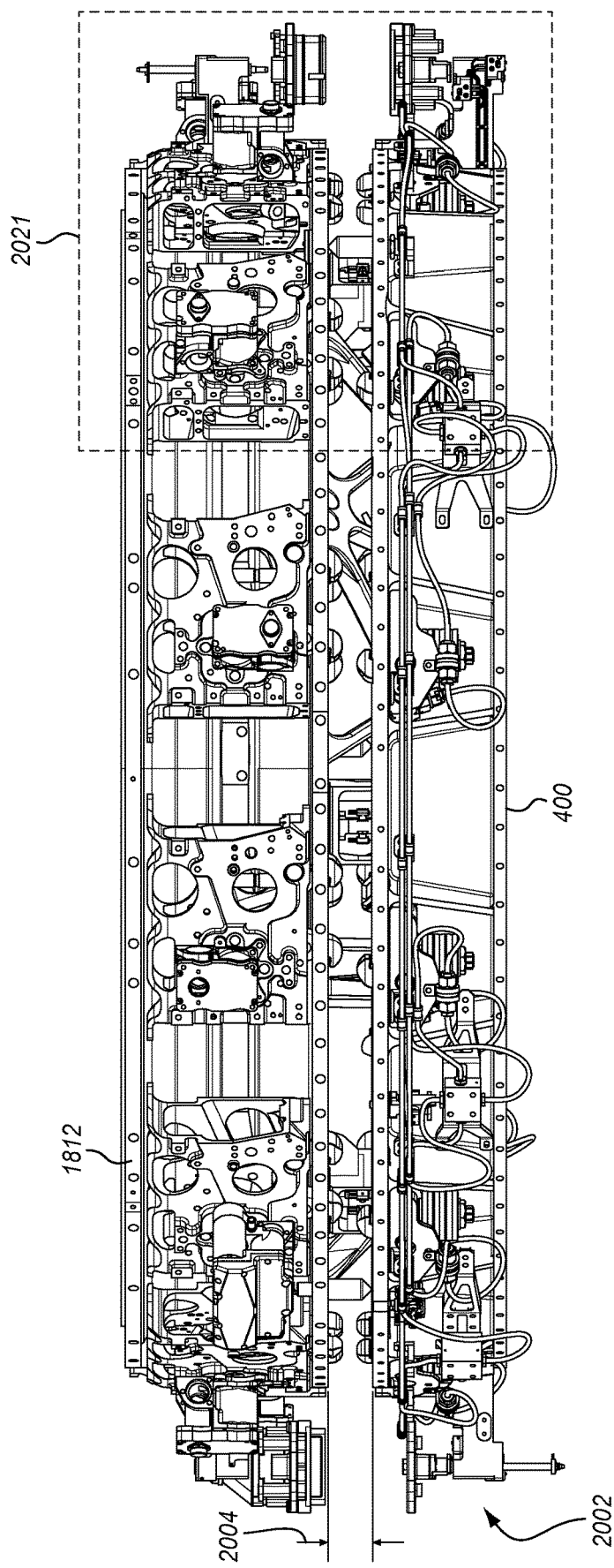
FIG. 20 is a side view of a berthing system in a soft capture position in relation to a docking system of a target spacecraft in an illustrative embodiment.
Figure 21:
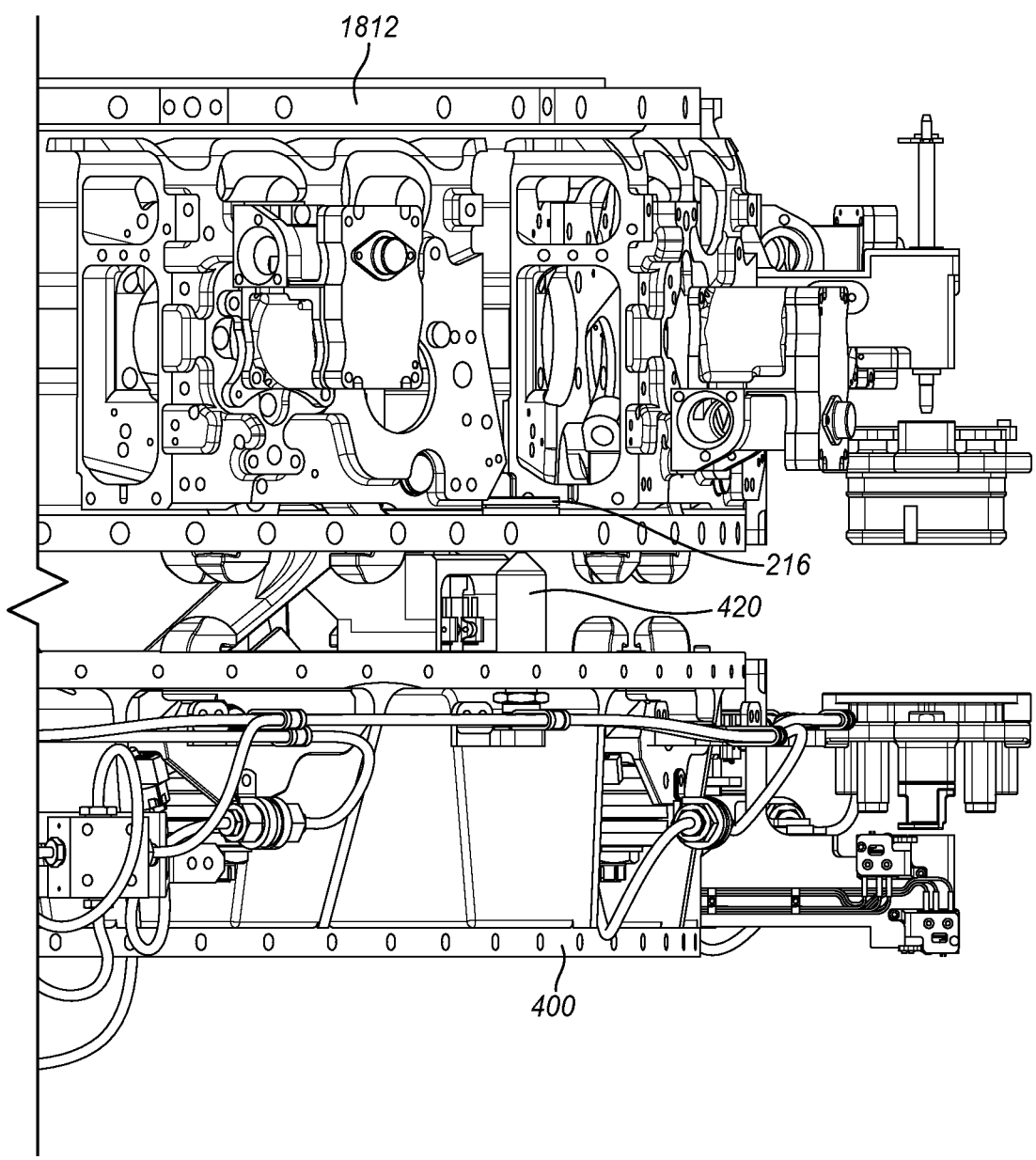
FIG. 21 is a magnified side view of a berthing system in a soft capture position in relation to a docking system of a target spacecraft in an illustrative embodiment.

The berthing operation as described below may be referred to as a manipulator-assisted berthing operation. Visiting spacecraft 1820 navigates to an initial position or meeting point adjacent to target spacecraft 1810 (step 1902). Manipulator 1814 of target spacecraft 1810 grasps visiting spacecraft 1820 (step 1904), and maneuvers visiting spacecraft 1820 to a capture position (step 1906). At the capture position, berthing system 400 of visiting spacecraft 1820 is aligned with docking system 1812 of target spacecraft 1810. Manipulator 1814 moves visiting spacecraft 1820 so that guide petals 440 contact docking system 1812 of target spacecraft 1810 and slide along docking system 1812 to a soft capture position (step 1908). Guide petals 440 act as course alignment guides for berthing system 400 as they slide along docking system 1812 of target spacecraft 1810 until docking system 1812 contacts petal bases 712 (see FIG. 7). FIG. 20 is a side view of berthing system 400 in a soft capture position in relation to docking system 1812 of target spacecraft 1810 in an illustrative embodiment. When at the soft capture position 2002, there is a gap 2004 between berthing system 400 and docking system 1812 (e.g., about two inches). FIG. 21 is a magnified side view of berthing system 400 in soft capture position 2002 in relation to docking system 1812 of target spacecraft 1810 in an illustrative embodiment. The magnified side view is of view window 2021 in FIG. 20. When in the soft capture position 2002, guide pin 420 of berthing system 400 is about to engage a guide pin receptacle 216 on docking system 1812.

Figure 22:
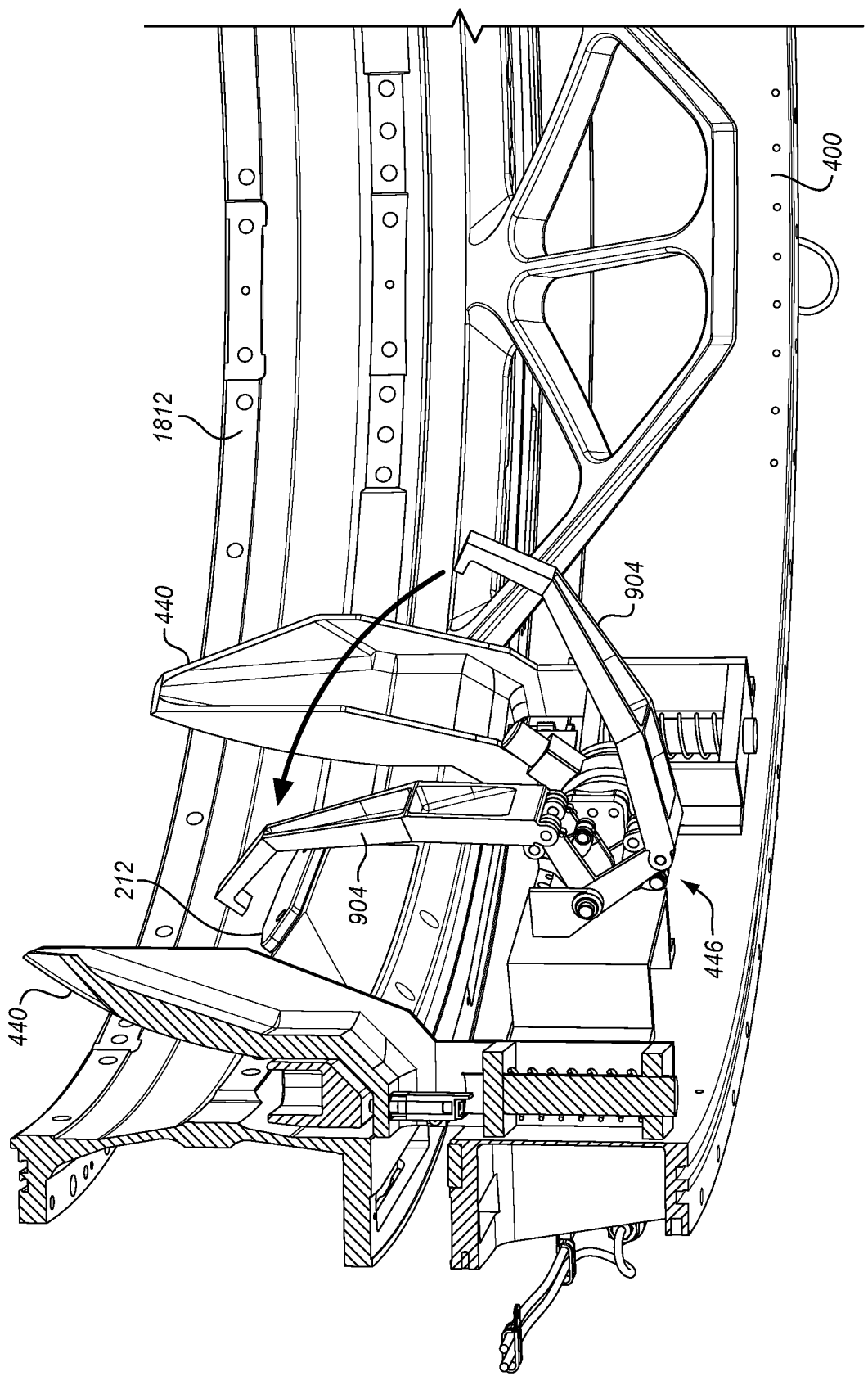
FIG. 22 is a perspective view of a capture latch activating in an illustrative embodiment.

When at the soft capture position 2002, docking system 1812 of target spacecraft 1810 contacts soft capture sensors 720, and soft capture sensors 720 generate an indicator of contact with docking system 1812 (step 1910). At this point, capture latches 446 are activated to engage mechanical latch strikers 212 on docking system 1812 in response to the indicator from soft capture sensors 720 (step 1912). FIG. 22 is a perspective view of a capture latch 446 activating in an illustrative embodiment. In FIG. 22, capture latches 446 open and extend to position latch arm 904 proximate to a mechanical latch striker 212 of docking system 1812. With capture latches 446 engaged with the mechanical latch strikers 212 on docking system 1812, manipulator 1814 may transition to "limp mode".

Figure 23:
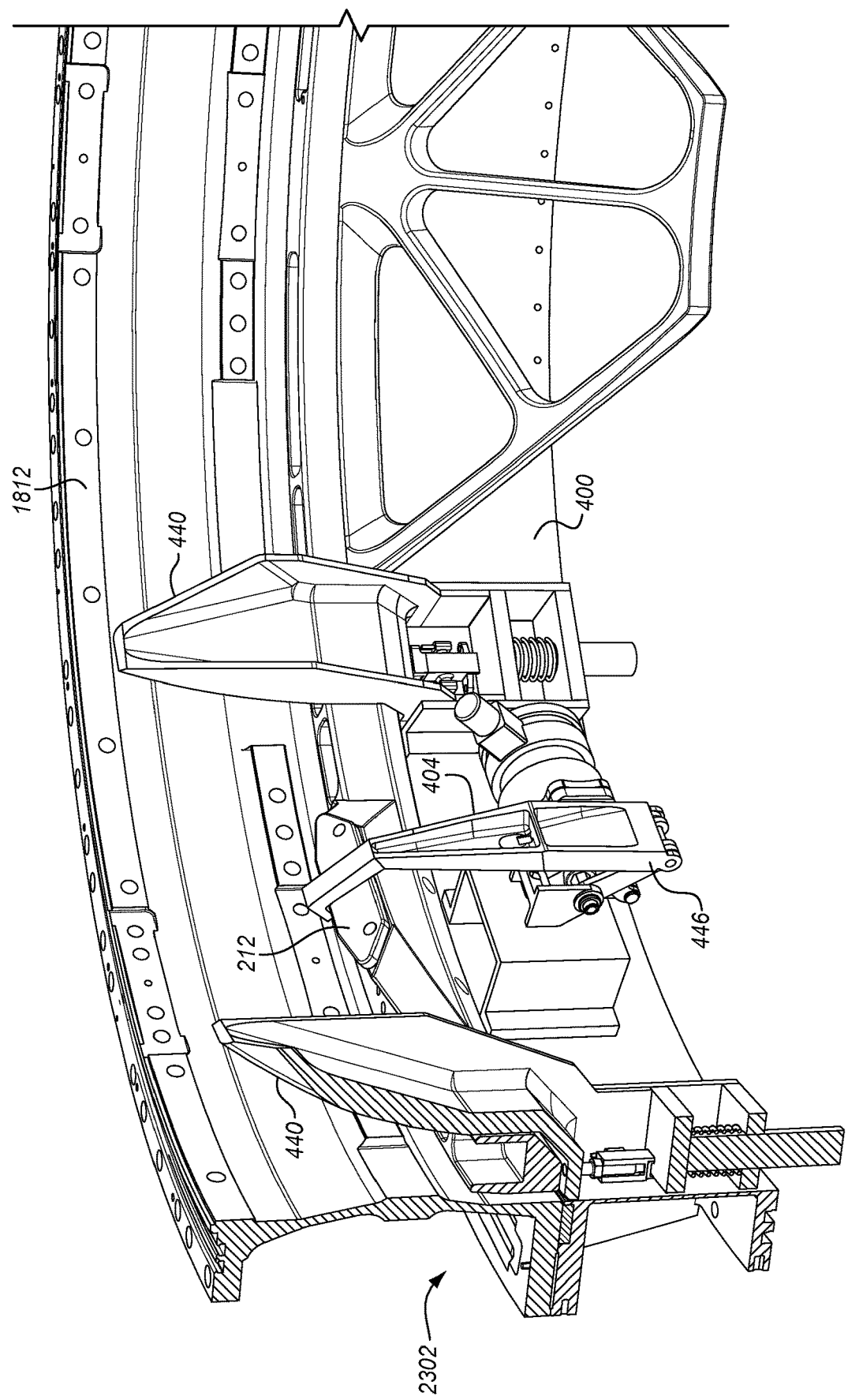
FIG. 23 is a perspective view of a capture latch drawing a berthing system to a hard capture position in an illustrative embodiment.
Figure 24:
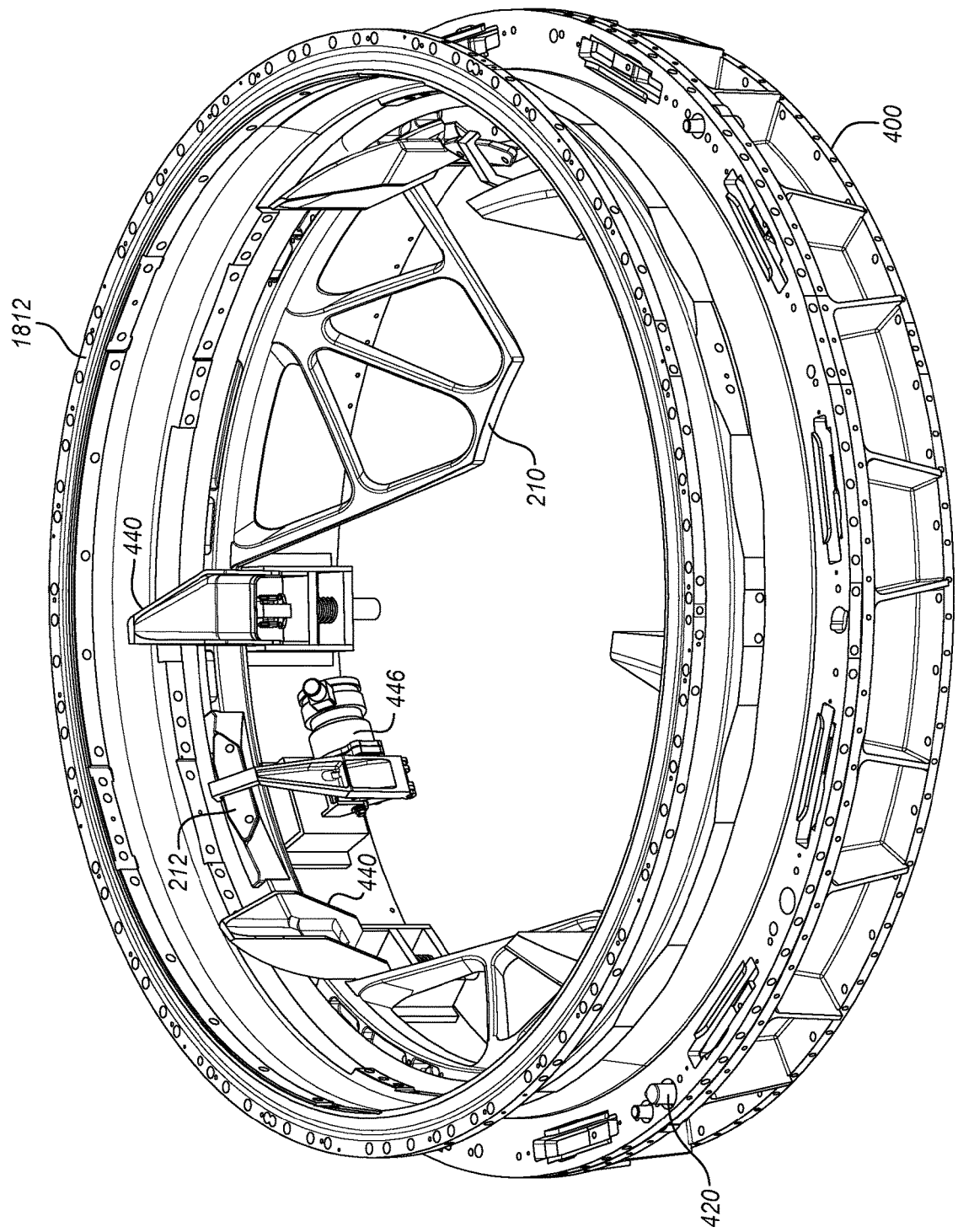
FIG. 24 is a perspective view of a berthing system mated with a docking system in an illustrative embodiment.

In FIG. 19, capture latches 446 draw berthing system 400 toward docking system 1812 to a hard capture position (step 1914), where interface surface 415 of berthing system 400 contacts a corresponding interface surface 205 of docking system 1812. FIG. 23 is a perspective view of a capture latch 446 drawing berthing system 400 to a hard capture position 2302 in an illustrative embodiment. When at the hard capture position 2302, guide petals 440 are compressed until contact is made between interface surface 415 of berthing system 400 and interface surface 205 of docking system 1812. Also at the hard capture position, docking system 1812 of target spacecraft 1810 contacts hard capture sensors 426, and hard capture sensors 426 generate an indicator of contact with docking system 1812 (step 1916). The indicators from hard capture sensors 426 indicate that hooks 424 are ready for engagement. Thus, hooks 424 of berthing system 400 are engaged with hooks 218 of docking system 1812 (step 1918) in response to the indicator from hard capture sensors 426. If hooks 424 comprise passive hooks 1400 (see FIG. 14), then the indicator from hard capture sensors 426 may be forwarded to docking system 1812 to activate its active hooks. If hooks 424 comprise active hooks 1500 (see FIG. 15), then active hooks 1500 may be activated to engage with passive hooks on docking system 1812. The berthing operation is complete when tunnel 402 of berthing system 400 and the tunnel 202 of docking system 1812 are in full contact, and the hooks 424 are engaged with structural latching and sealing at the docking interface in order to transfer structural loads between the spacecraft 1810/1820 and to create a transfer tunnel which can be pressurized for crew and cargo transfer. FIG. 24 is a perspective view of a berthing system 400 mated with docking system 1812 in an illustrative embodiment. There may be other functions that are performed for a berthing operation that are not discussed for the sake of brevity, such as engaging resource umbilicals 450 with PDTUs 220 on docking system 1812, disconnecting manipulator 1814 from visiting spacecraft 1820, etc.

Although specific embodiments were described herein, the scope is not limited to those specific embodiments. Rather, the scope is defined by the following claims and any equivalents thereof.

The invention claimed is:

1. A berthing system for a visiting spacecraft, the berthing system comprising:
    a tunnel having a first end configured to attach to the visiting spacecraft, and a second end that includes an interface surface that defines a hard capture mating plane for mating with a docking system of a target spacecraft;
    hooks disposed circumferentially on the interface surface of the tunnel;
    one or more pressure seals disposed on the interface surface;
    spring-loaded guide petals spaced around an inner peripheral surface of the tunnel, wherein the spring-loaded guide petals project in an axial direction beyond the interface surface and point radially inward; and
    capture latches spaced around the inner peripheral surface of the tunnel, and configured to engage mechanical latch strikers on the docking system of the target spacecraft;
    wherein the spring-loaded guide petals define a soft capture mating plane axially outward from the hard capture mating plane;
    wherein the spring-loaded guide petals are configured to independently slide in the axial direction.

2. The berthing system of claim 1 wherein:
    a conic outline of the spring-loaded guide petals is less than a diameter of the tunnel.

3. The berthing system of claim 1 wherein the spring-loaded guide petals each include:
    a contact surface that curves radially inward in the axial direction; and
    a petal base parallel to the interface surface of the tunnel that defines the soft capture mating plane;
    wherein the petal base is above the interface surface in the axial direction when the spring-loaded guide petals are in a soft capture state.

4. The berthing system of claim 3 wherein the spring-loaded guide petals each include:
    a soft capture sensor at the petal base configured to indicate contact with the docking system of the target spacecraft.

5. The berthing system of claim 1 wherein the spring-loaded guide petals are part of guide petal assemblies that include:
    a mounting member affixed to the inner peripheral surface of the tunnel;
    a guide petal of the spring-loaded guide petals slidably coupled to the mounting member; and
    an elastic member between the mounting member and the guide petal configured to apply a force on the guide petal in the axial direction away from the interface surface.

6. The berthing system of claim 1 wherein the capture latches comprise:
    a latch actuator; and
    a latch arm that is mechanically linked to the latch actuator by a linkage, and configured to engage one of the mechanical latch strikers on the docking system of the target spacecraft.

7. The berthing system of claim 1 further comprising:
    guide pins that project in the axial direction from the interface surface of the tunnel; and
    guide pin receptacles recessed in the axial direction from the interface surface.

8. The berthing system of claim 7 wherein:
    a length of the guide pins corresponds with a distance between the hard capture mating plane and the soft capture mating plane.

9. The berthing system of claim 7 further comprising:
    unberthing complete sensors disposed at the guide pin receptacles, and configured to indicate when guide pins on the docking system of the target spacecraft disengage from the guide pin receptacles.

10. The berthing system of claim 1 further comprising:
    hard capture sensors at the interface surface configured to indicate contact with the docking system of the target spacecraft.

11. The berthing system of claim 1 wherein the hooks comprise:
    passive hooks configured to engage with active hooks on the docking system of the target spacecraft.

12. The berthing system of claim 11 further comprising:
    pyrotechnic bolts configured to release the passive hooks.

13. The berthing system of claim 1 wherein the hooks comprise:
    pairs of active hooks and passive hooks.

14. A berthing system of a visiting spacecraft for attaching to an International Docking Adapter (IDA), the berthing system comprising:
    a Hard Capture System (HCS) comprising:
        a tunnel having a first end configured to attach to the visiting spacecraft, and a second end that includes an interface surface that defines a hard capture mating plane for mating with the IDA of a target spacecraft;
        hooks disposed circumferentially along the interface surface of the tunnel, and configured to engage with corresponding hooks on the IDA;
        one or more pressure seals disposed radially inward from the hooks along the interface surface;
        guide pins that project in an axial direction from the interface surface of the tunnel; and
        guide pin receptacles recessed in the axial direction from the interface surface; and
    a Soft Capture System (SCS) comprising:
        guide petal assemblies spaced around an inner peripheral surface of the tunnel, wherein the guide petal assemblies include:
            a mounting member affixed to the inner peripheral surface of the tunnel;
            a spring-loaded guide petal slidably coupled to the mounting member, and configured to project axially beyond the interface surface and point radially inward to define a soft capture mating plane axially above the hard capture mating plane; and
            an elastic member between the mounting member and the guide petal configured to apply a force on the guide petal in the axial direction away from the interface surface; and
        capture latches spaced around the inner peripheral surface of the tunnel, wherein the capture latches are configured to extend to engage mechanical latch strikers on the IDA, and to retract to draw the interface surface of the tunnel toward the IDA;
        wherein spring-loaded guide petals of the guide petal assemblies are configured to independently slide in the axial direction.

15. The berthing system of claim 14 wherein the HCS further comprises:
    hard capture sensors configured to indicate when the IDA contacts the interface surface.

16. The berthing system of claim 14 wherein the hooks comprise:
    passive hooks configured to engage with active hooks on the IDA.

17. The berthing system of claim 16 further comprising:
    pyrotechnic bolts configured to release the passive hooks.

18. The berthing system of claim 14 wherein the guide petal includes:
    a contact surface that curves radially inward in the axial direction;
    a petal base parallel to the interface surface of the tunnel that defines the soft capture mating plane; and
    a soft capture sensor at the petal base configured to indicate when the IDA contacts the petal base.

19. The berthing system of claim 14 wherein:
    a pair of the guide petal assemblies and one of the capture latches are mounted in groupings along the inner peripheral surface of the tunnel, with the one of the capture latches interposed between the pair of the guide petal assemblies at each of the groupings.

20. A method of performing a berthing operation of a visiting spacecraft, the method comprising:
    navigating the visiting spacecraft to an initial position adjacent to a target spacecraft;
    grasping the visiting spacecraft with a manipulator on the target spacecraft;
    maneuvering the visiting spacecraft with the manipulator to a capture position so that a berthing system of the visiting spacecraft is aligned with a docking system of the target spacecraft, wherein the berthing system comprises:
        a tunnel having a first end configured to attach to the visiting spacecraft, and a second end that includes an interface surface that defines a hard capture mating plane for mating with the docking system of the target spacecraft;
        one or more pressure seals disposed on the interface surface; and
        spring-loaded guide petals spaced around an inner peripheral surface of the tunnel that project in an axial direction beyond the interface surface and point radially inward;
        wherein the spring-loaded guide petals define a soft capture mating plane axially outward from the hard capture mating plane;
        wherein the spring-loaded guide petals are configured to independently slide in the axial direction;
    moving the visiting spacecraft with the manipulator so that the guide petals of the berthing system contact the docking system of the target spacecraft and slide along the docking system to a soft capture position;
    generating an indicator of contact with the docking system of the target spacecraft via soft capture sensors on the guide petals;
    activating capture latches on the berthing system, which are spaced around the inner peripheral surface of the tunnel, to engage mechanical latch strikers on the docking system of the target spacecraft in response to the indicator from the soft capture sensors;
    drawing the berthing system toward the docking system of the target spacecraft to a hard capture position;
    generating an indicator of contact with the docking system of the target spacecraft via hard capture sensors; and
    engaging hooks of the berthing system, which are disposed circumferentially on the interface surface of the tunnel, with hooks of the docking system of the target spacecraft in response to the indicator from the hard capture sensors.

* * * * *